United States Patent
Goto et al.

(10) Patent No.: US 11,501,203 B2
(45) Date of Patent: Nov. 15, 2022

(54) LEARNING DATA SELECTION METHOD, LEARNING DATA SELECTION DEVICE, AND COMPUTER-READABLE RECORDING MEDIUM

(71) Applicant: FUJITSU LIMITED, Kawasaki (JP)

(72) Inventors: Keisuke Goto, Kawasaki (JP); Koji Maruhashi, Hachioji (JP); Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 1093 days.

(21) Appl. No.: 16/135,446

(22) Filed: Sep. 19, 2018

(65) Prior Publication Data
US 2019/0087384 A1 Mar. 21, 2019

(30) Foreign Application Priority Data
Sep. 19, 2017 (JP) .............................. JP2017-179609

(51) Int. Cl.
*G06N 20/00* (2019.01)
*G06K 9/62* (2022.01)

(52) U.S. Cl.
CPC ........... *G06N 20/00* (2019.01); *G06K 9/6215* (2013.01); *G06K 9/6227* (2013.01); *G06K 9/6239* (2013.01); *G06K 9/6256* (2013.01)

(58) Field of Classification Search
CPC ..... G06N 20/00; G06K 9/6215; G06K 9/6227
See application file for complete search history.

(56) References Cited

U.S. PATENT DOCUMENTS

2016/0358074 A1   12/2016   Latapie et al.
2017/0200066 A1   7/2017   Wang et al.

OTHER PUBLICATIONS

Extended European Search dated Jul. 19, 2019 for corresponding European Patent Application No. 18195436.3, 8 pages.
Ribeiro, et al., "Why Should I Trust You?" Explaining the Predictions of Any Classifier, Proceedings of the 22nd ACM SIGKDD International Conference on Knowledge Discovery and Data Mining, Aug. 2016 (10 pages).

*Primary Examiner* — Robert G Bachner
(74) *Attorney, Agent, or Firm* — Fujitsu Patent Center

(57) ABSTRACT

A non-transitory computer-readable recording medium stores therein a learning data selection program that causes a computer to execute a process including: extracting a first input data group relating to first input data in correspondence with designation of the first input data included in an input data group input to a machine learning model, the machine learning model classifying or determining transformed data that is transformed from input data; acquiring a first transformed data group of the machine learning model and a first output data group of the machine learning model, respectively, the first transformed data group being input to the machine learning model and corresponding to the first input data group, the first output data group corresponding to the first transformed data group; and selecting learning target data of an estimation model from the first input data group.

9 Claims, 28 Drawing Sheets

FIG.2
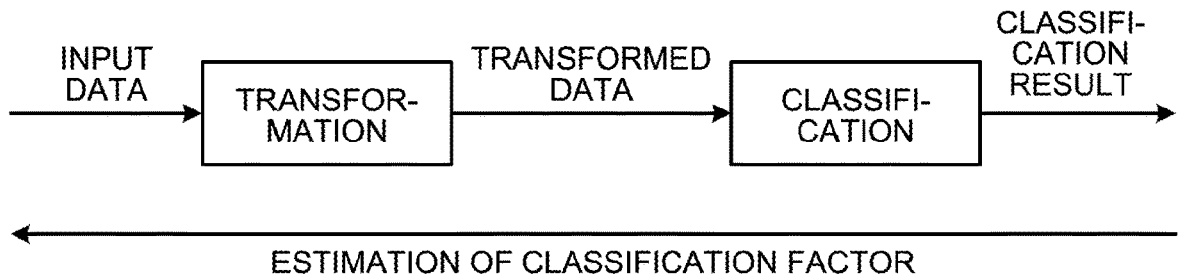
FIG.3
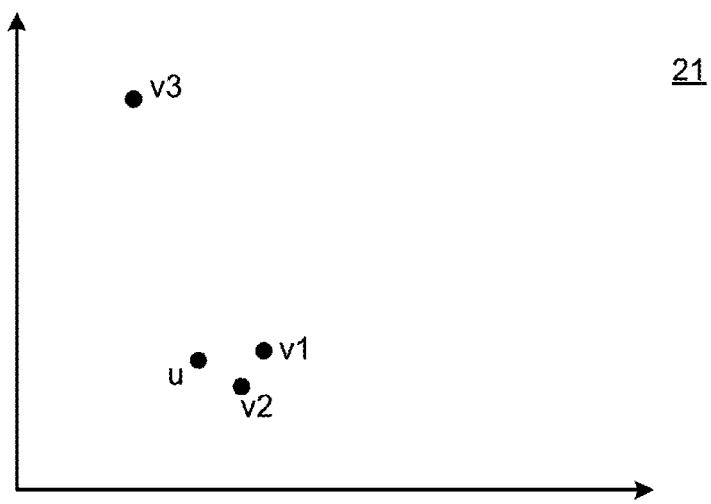
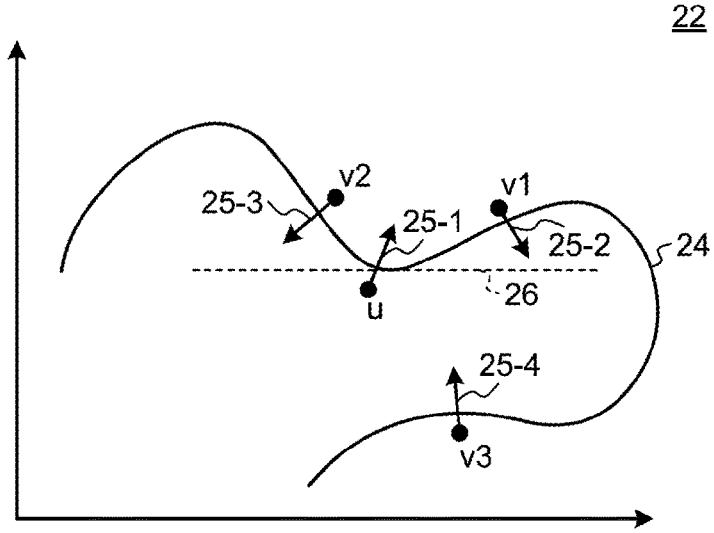

FIG.8A

INPUT DATA 801

| COMMUNICATION SOURCE HOST | COMMUNICATION DESTINATION HOST | PORT | AMOUNT |
|---|---|---|---|
| S3 | R1 | P1 | 1 |
| S3 | R2 | P1 | 1 |
| S3 | R3 | P1 | 1 |
| S1 | R3 | P3 | 2 |
| S2 | R1 | P1 | 1 |

SEQUENCING 803

S3→S'1
S1→S'2
S2→S'3
R1→R'1
R2→R'2
R3→R'3
P1→P'1
P3→P'2

INTERMEDIATE DATA 805

| COMMUNICATION SOURCE HOST | COMMUNICATION DESTINATION HOST | PORT | AMOUNT |
|---|---|---|---|
| S'1 | R'1 | P'1 | 1 |
| S'1 | R'2 | P'1 | 1 |
| S'1 | R'3 | P'1 | 1 |
| S'2 | R'3 | P'2 | 2 |
| S'3 | R'1 | P'1 | 1 |

FIG. 8B v1

INPUT DATA 811

| COMMUNICATION SOURCE HOST | COMMUNICATION DESTINATION HOST | PORT | AMOUNT |
|---|---|---|---|
| S3 | R1 | P1 | 1 |
| S3 | R2 | P1 | 1 |
| S2 | R3 | P3 | 1 |
| S2 | R3 | P1 | 1 |
| S2 | R2 | P1 | 1 |

SEQUENCING 813:
S2→S'2
S3→S'1
R1→R'1
R2→R'2
R3→R'3
P1→P'1
P3→P'2

INTERMEDIATE DATA 815

| COMMUNICATION SOURCE HOST | COMMUNICATION DESTINATION HOST | PORT | AMOUNT |
|---|---|---|---|
| S'1 | R'1 | P'1 | 1 |
| S'1 | R'2 | P'1 | 1 |
| S'2 | R'3 | P'1 | 1 |
| S'2 | R'3 | P'2 | 1 |
| S'2 | R'2 | P'1 | 1 |

DISTANCE 5

--- v2

INPUT DATA 821

| COMMUNICATION SOURCE HOST | COMMUNICATION DESTINATION HOST | PORT | AMOUNT |
|---|---|---|---|
| S2 | R1 | P1 | 1 |
| S2 | R2 | P1 | 1 |
| S1 | R3 | P2 | 1 |
| S1 | R1 | P1 | 1 |
| S3 | R3 | P2 | 1 |

SEQUENCING 823:
S1→S'3
S2→S'2
S3→S'1
R1→R'1
R2→R'2
R3→R'3
P1→P'1
P2→P'2

INTERMEDIATE DATA 825

| COMMUNICATION SOURCE HOST | COMMUNICATION DESTINATION HOST | PORT | AMOUNT |
|---|---|---|---|
| S'1 | R'1 | P'1 | 1 |
| S'1 | R'2 | P'1 | 1 |
| S'3 | R'3 | P'2 | 1 |
| S'3 | R'1 | P'1 | 1 |
| S'2 | R'3 | P'2 | 1 |

DISTANCE 4

--- v3

INPUT DATA 831

| COMMUNICATION SOURCE HOST | COMMUNICATION DESTINATION HOST | PORT | AMOUNT |
|---|---|---|---|
| S3 | R1 | P1 | 1 |
| S3 | R2 | P1 | 1 |
| S2 | R1 | P2 | 1 |
| S2 | R1 | P3 | 1 |
| S2 | R1 | P4 | 1 |

SEQUENCING 833:
S2→S'2
S3→S'1
R1→R'1
R2→R'2
P1→P'1
P2→P'2
P3→P'3
P4→P'4

INTERMEDIATE DATA 835

| COMMUNICATION SOURCE HOST | COMMUNICATION DESTINATION HOST | PORT | AMOUNT |
|---|---|---|---|
| S'1 | R'1 | P'1 | 1 |
| S'1 | R'2 | P'1 | 1 |
| S'2 | R'1 | P'2 | 1 |
| S'2 | R'1 | P'3 | 1 |
| S'2 | R'1 | P'4 | 1 |

DISTANCE 9

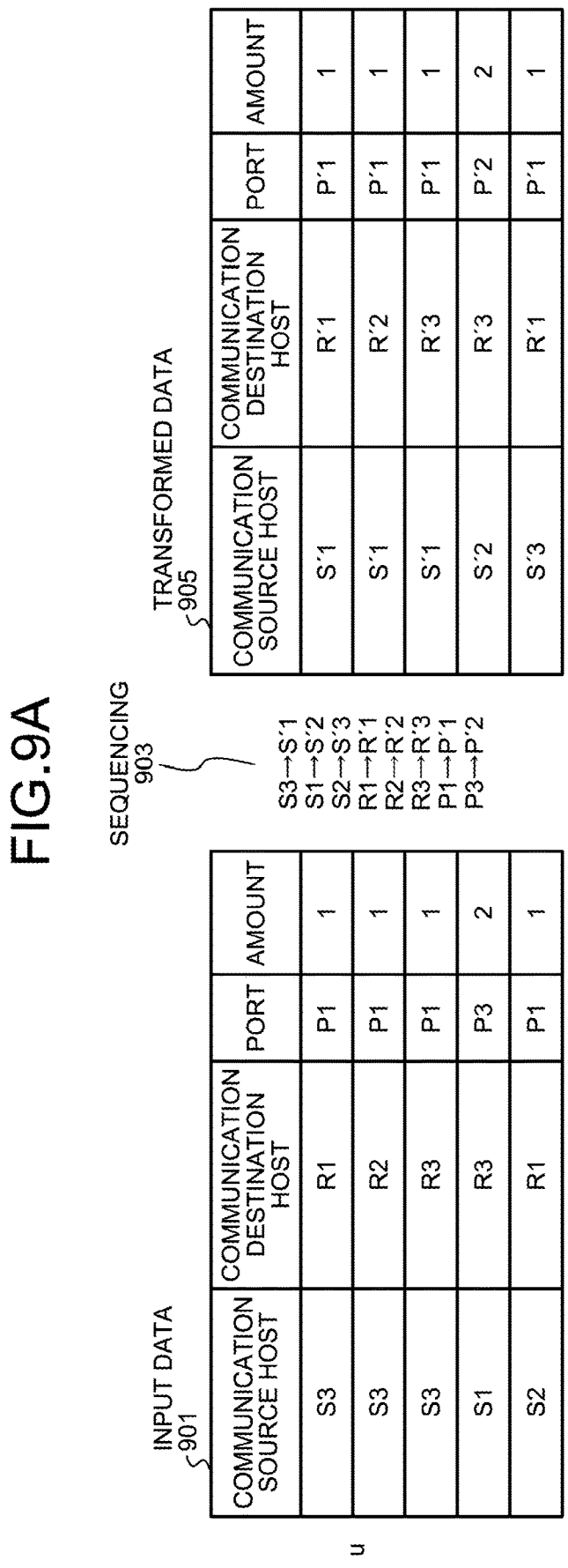

FIG.9B v1

INPUT DATA 911

| COMMUNICATION SOURCE HOST | COMMUNICATION DESTINATION HOST | PORT | AMOUNT |
|---|---|---|---|
| S3 | R1 | P1 | 1 |
| S3 | R2 | P1 | 1 |
| S2 | R3 | P3 | 1 |
| S2 | R2 | P1 | 1 |

SEQUENCING 913
S2→S'2
S3→S'1
R1→R'1
R2→R'2
R3→R'3
P1→P'1
P3→P'3

TRANSFORMED DATA 915

| COMMUNICATION SOURCE HOST | COMMUNICATION DESTINATION HOST | PORT | AMOUNT |
|---|---|---|---|
| S'1 | R'1 | P'1 | 1 |
| S'1 | R'2 | P'1 | 1 |
| S'2 | R'3 | P'3 | 1 |
| S'2 | R'2 | P'1 | 1 |

DISTANCE 9 v2

INPUT DATA 921

| COMMUNICATION SOURCE HOST | COMMUNICATION DESTINATION HOST | PORT | AMOUNT |
|---|---|---|---|
| S2 | R1 | P1 | 1 |
| S2 | R2 | P2 | 1 |
| S1 | R3 | P1 | 1 |
| S1 | R3 | P2 | 1 |

SEQUENCING 923
S1→S'3
S2→S'2
S3→S'1
R1→R'1
R2→R'2
R3→R'3
P1→P'1
P2→P'2

TRANSFORMED DATA 925

| COMMUNICATION SOURCE HOST | COMMUNICATION DESTINATION HOST | PORT | AMOUNT |
|---|---|---|---|
| S'2 | R'1 | P'1 | 1 |
| S'2 | R'2 | P'1 | 1 |
| S'3 | R'3 | P'2 | 1 |
| S'3 | R'3 | P'1 | 1 |
| S'1 | R'3 | P'2 | 1 |

DISTANCE 8 v3

INPUT DATA 931

| COMMUNICATION SOURCE HOST | COMMUNICATION DESTINATION HOST | PORT | AMOUNT |
|---|---|---|---|
| S3 | R1 | P1 | 1 |
| S3 | R2 | P1 | 1 |
| S2 | R1 | P2 | 1 |
| S2 | R1 | P3 | 1 |
| S2 | R1 | P4 | 1 |

SEQUENCING 933
S2→S'2
S3→S'1
R1→R'1
R2→R'2
P1→P'1
P2→P'2
P3→P'3
P4→P'4

TRANSFORMED DATA 935

| COMMUNICATION SOURCE HOST | COMMUNICATION DESTINATION HOST | PORT | AMOUNT |
|---|---|---|---|
| S'1 | R'1 | P'1 | 1 |
| S'1 | R'2 | P'1 | 1 |
| S'2 | R'1 | P'2 | 1 |
| S'2 | R'1 | P'3 | 1 |
| S'2 | R'1 | P'4 | 1 |

DISTANCE 9

FIG.10

|  | v1 | v2 | v3 |
|---|---|---|---|
| INPUT DATA FEATURE SPACE | 5 | 4 | 9 |
| TRANSFORMED DATA FEATURE SPACE | 9 | 8 | 9 |
| SUM | 14 | 12 | 18 |

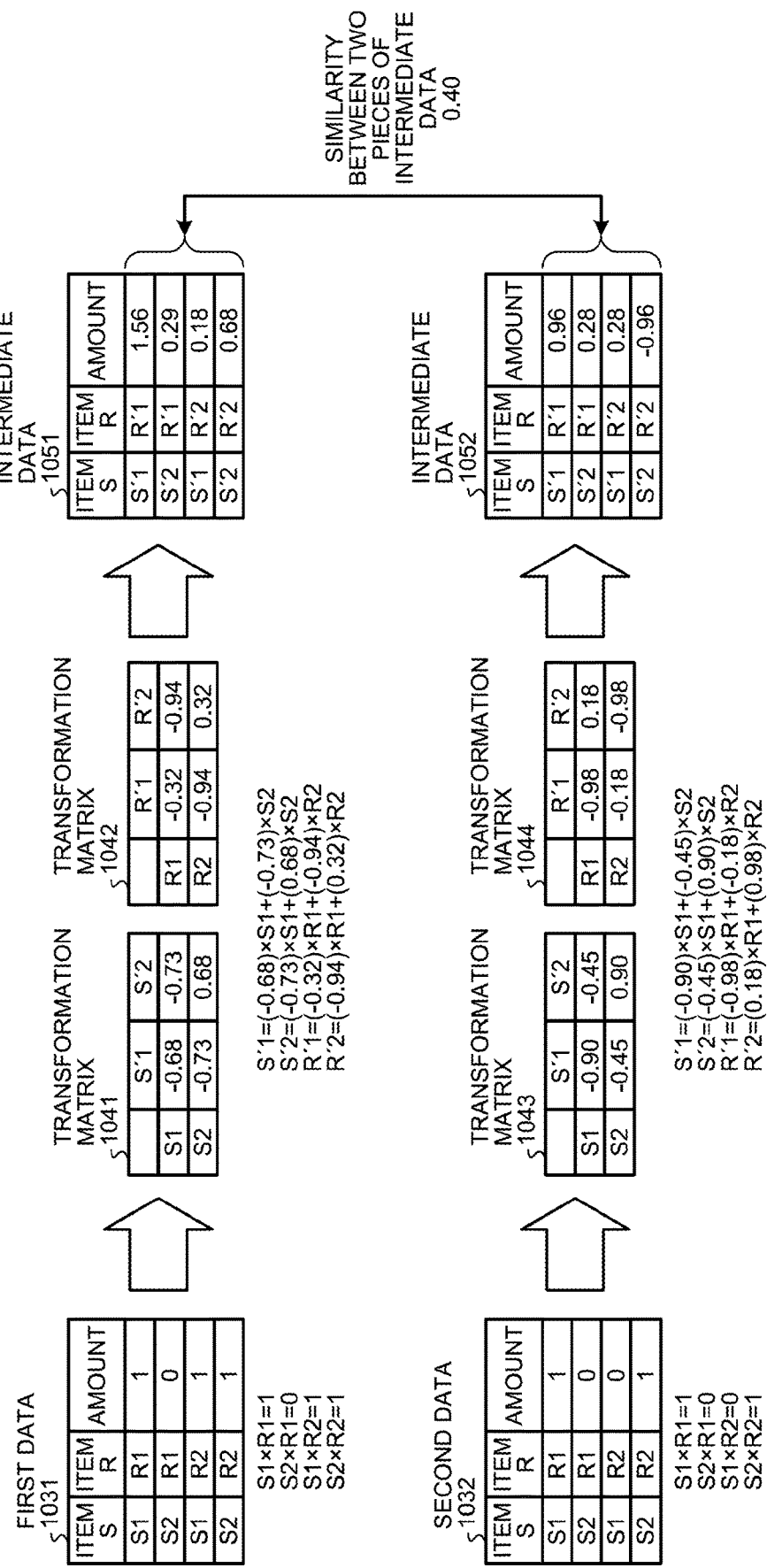

FIG.19

GENERATION OF INTERMEDIATE DATA THROUGH TRANSFORMATION OF OTHER THAN ITEM S

INTERMEDIATE DATA (FIRST DATA) 1053

| ITEM S | ITEM R | AMOUNT |
|---|---|---|
| S1 | R'1 | -1.27 |
| S2 | R'1 | -0.95 |
| S1 | R'2 | -0.62 |
| S2 | R'2 | 0.33 |

$v1_1 = (-1.27, -0.62)$
$v2_1 = (-0.95, 0.33)$

S1×R'1=(-0.32)×S1×R1+(-0.94)×S1×R2
S2×R'1=(-0.32)×S2×R1+(-0.94)×S2×R2
S1×R'2=(-0.94)×S1×R1+(0.32)×S1×R2
S2×R'2=(-0.94)×S2×R1+(0.32)×S2×R2

INTERMEDIATE DATA (SECOND DATA) 1054

| ITEM S | ITEM R | AMOUNT |
|---|---|---|
| S1 | R'1 | -0.98 |
| S2 | R'1 | -0.18 |
| S1 | R'2 | 0.18 |
| S2 | R'2 | -0.98 |

$v1_2 = (-0.98, 0.18)$
$v2_2 = (-0.18, -0.98)$

S1×R'1=(-0.98)×S1×R1+(-0.18)×S1×R2
S2×R'1=(-0.98)×S2×R1+(-0.18)×S2×R2
S1×R'2=(0.18)×S1×R1+(-0.98)×S1×R2
S2×R'2=(0.18)×S2×R1+(-0.98)×S2×R2

SIMILARITY MATRIX 1061

FIRST DATA \ SECOND DATA

| | S1 | S2 |
|---|---|---|
| S1 | 1.14 ($v1_1 \cdot v1_2$) | 0.83 ($v1_1 \cdot v2_2$) |
| S2 | 0.99 ($v2_1 \cdot v1_2$) | -0.15 ($v2_1 \cdot v2_2$) |

UPDATE TRANSFORMATION MATRICES OF "ITEM S"

TRANSFORMATION MATRIX (FIRST DATA) 1041a

| | S'1 | S'2 |
|---|---|---|
| S1 | -0.85 | -0.53 |
| S2 | -0.53 | 0.85 |

TRANSFORMATION MATRIX (SECOND DATA) 1043a

| | S'1 | S'2 |
|---|---|---|
| S1 | -0.92 | 0.39 |
| S2 | -0.39 | -0.92 |

UPDATE IS PERFORMED TO BE CLOSEST TO SIMILARITY MATRIX WHEN BEING MADE INTO ONE MATRIX THROUGH MULTIPLICATION

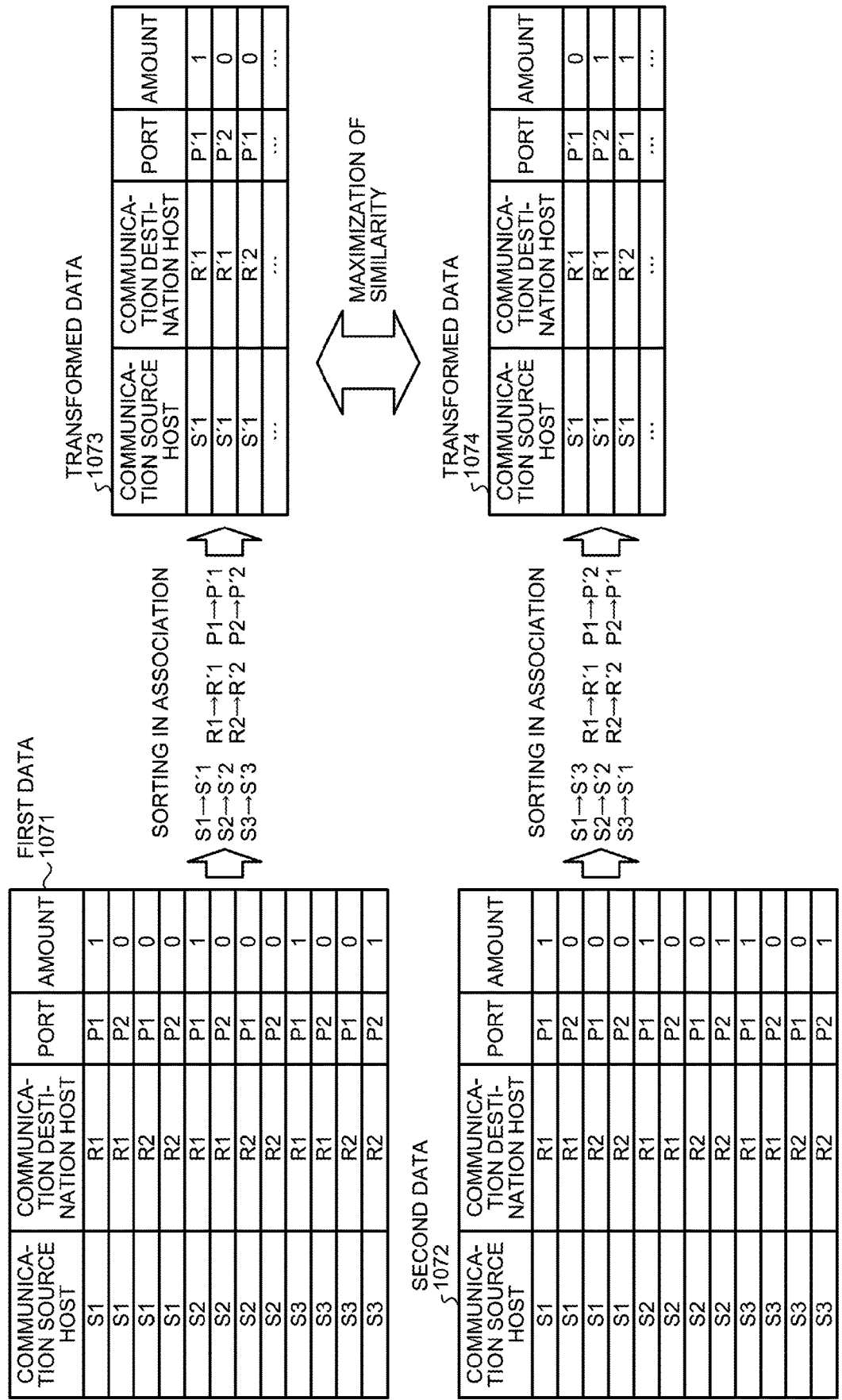

FIG.26

SECOND DATA 1072

| COMMUNICATION SOURCE HOST | COMMUNICATION DESTINATION HOST | PORT | AMOUNT |
|---|---|---|---|
| S1 | R1 | P1 | 1 |
| S1 | R1 | P2 | 0 |
| S1 | R2 | P1 | 0 |
| S1 | R2 | P2 | 0 |
| S2 | R1 | P1 | 1 |
| S2 | R1 | P2 | 0 |
| S2 | R2 | P1 | 1 |
| S2 | R2 | P2 | 1 |
| S3 | R1 | P1 | 0 |
| S3 | R2 | P1 | 0 |
| S3 | R2 | P2 | 1 |

THIRD DATA 1075

| COMMUNICATION SOURCE HOST | COMMUNICATION DESTINATION HOST | PORT | AMOUNT |
|---|---|---|---|
| S1 | R1 | P1 | 1 |
| S1 | R1 | P2 | 1 |
| S1 | R2 | P1 | 0 |
| S1 | R2 | P2 | 0 |
| S2 | R1 | P1 | 1 |
| S2 | R1 | P2 | 0 |
| S2 | R2 | P1 | 0 |
| S2 | R2 | P2 | 0 |
| S3 | R1 | P1 | 1 |
| S3 | R2 | P1 | 0 |
| S3 | R2 | P2 | 1 |

SIMILARITY 0.89

SIMILARITY 0.89

FIRST DATA 1071

| COMMUNICATION SOURCE HOST | COMMUNICATION DESTINATION HOST | PORT | AMOUNT |
|---|---|---|---|
| S1 | R1 | P1 | 1 |
| S1 | R1 | P2 | 0 |
| S1 | R2 | P1 | 0 |
| S1 | R2 | P2 | 0 |
| S2 | R1 | P1 | 1 |
| S2 | R2 | P2 | 0 |
| S2 | R2 | P1 | 0 |
| S3 | R1 | P1 | 1 |
| S3 | R2 | P1 | 0 |
| S3 | R2 | P2 | 1 |

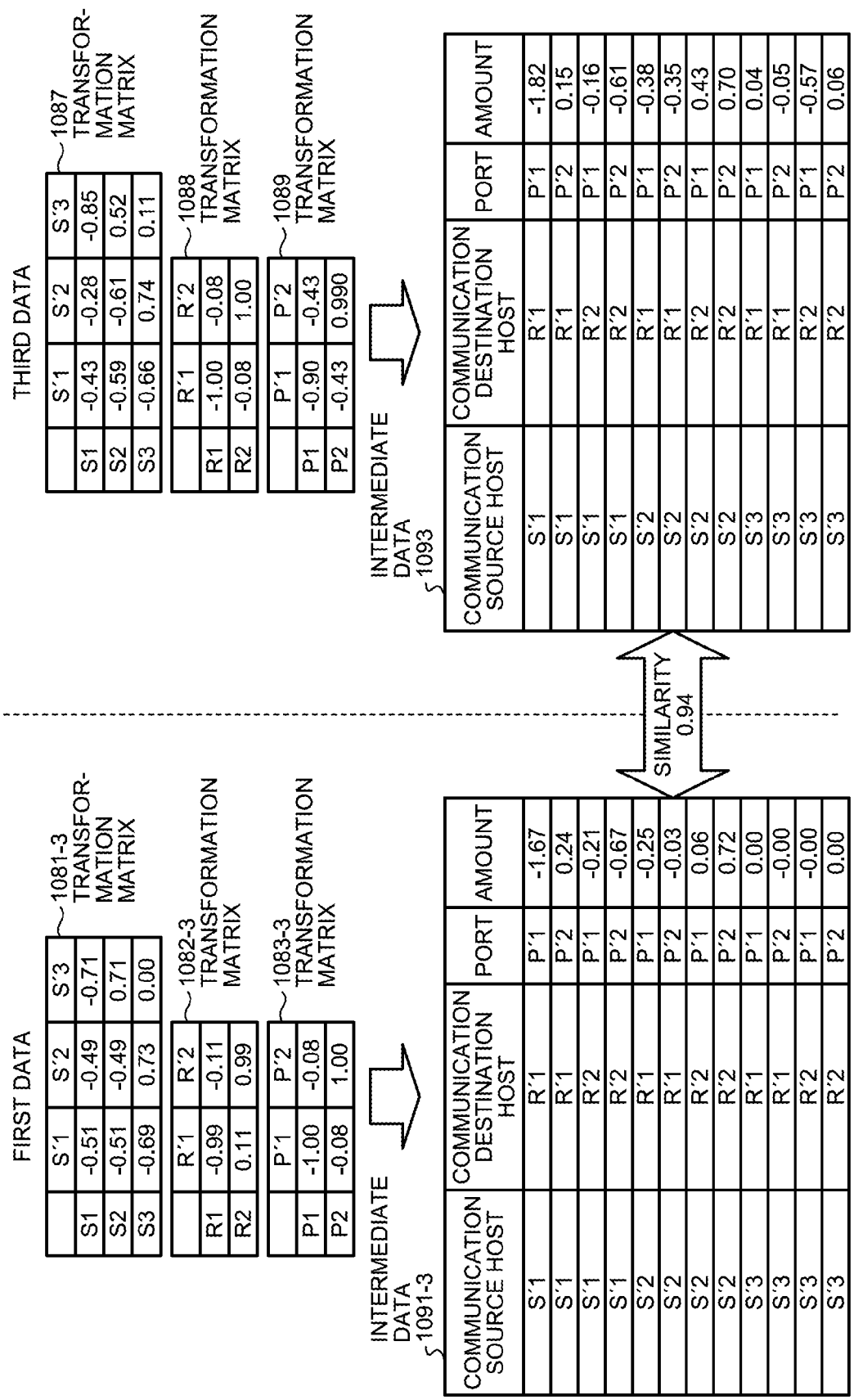

LEARNING DATA SELECTION METHOD, LEARNING DATA SELECTION DEVICE, AND COMPUTER-READABLE RECORDING MEDIUM

CROSS-REFERENCE TO RELATED APPLICATION

This application is based upon and claims the benefit of priority of the prior Japanese Patent Application No. 2017-179609, filed on Sep. 19, 2017, the entire contents of which are incorporated herein by reference.

FIELD

The embodiments discussed herein are related to a learning data selection program that selects learning target data, a learning data selection method, and a learning data selection device.

BACKGROUND

Recently, classification or determination which uses machine learning has been performed with respect to various fields of data. When using the machine learning, classification or determination with high accuracy is possible. On the other hand, typically, it is difficult to know which feature amount of the machine learning is the factor of classification or determination.

When the machine learning performs classification or determination, in a case where it is not clear that classification or determination is performed by which factor, for example, a risk is caused when expanding an application field of the machine learning.

As a method of estimating a feature that becomes the factor of classification from a classification result obtained by a classifier that can be used in the machine learning, there is known a method called local interpretable model-agnostic explanations (LIME) (for example, refer to "Why Should I Trust You?" Explaining the Predictions of Any Classifier, Marco Tulio Ribeiro et. al., Proceedings of the 22nd ACM SIGKDD International Conference on Knowledge Discovery and Data Mining, August, 2016). In LIME, with respect to an arbitrary classifier f and input data u, an element and a feature of u that greatly contributes to a classification result f(u) of u are estimated and suggested.

In the method of LIME described in "Why Should I Trust You?" Explaining the Predictions of Any Classifier, Marco Tulio Ribeiro et. al., Proceedings of the 22nd ACM SIGKDD International Conference on Knowledge Discovery and Data Mining, August, 2016, the following configuration is described. Specifically, estimation of cause for a classification result, in which an image is set as a target, is performed to estimate that which image portion contributes to the classification result.

FIG. 2 is a view illustrating an overview of classification of input data by a classifier and estimation of a classification factor. In classification performed by using a classifier of typical machine learning, transformed data, which is obtained by transforming input data into dimensions which can be processed by the classifier, is generated, and learning and classification are performed with respect to the transformed data that is generated.

With regard to classification performed by using a classifier of typical machine learning as illustrated in FIG. 2, when performing estimation of a classification factor with respect to a classification result by the method of LIME, estimation is made for correlation of a classification result with which factor of the transformed data instead of correlation of the classification result with which factor of input data. Accordingly, it is difficult to say that the estimation is useful.

As described above, in the classifier of the machine learning in which transformed data is generated by transforming input data into dimensions capable of being processed by the classifier, and learning and classification are performed with respect to the transformed data that is generated, estimation of a classification factor in the input data is demanded.

FIG. 3 is a view illustrating an overview of input data and transformed data which are related to the classifier of the machine learning, in which classification of the transformed data generated from the input data is performed, and which are supplied to the classifier in each feature space. In FIG. 3, a point u corresponds to data that is determined as a positive example, and a point v1, a point v2, and a point v3 correspond to data that is determined as a negative example. The points are points on an input data feature space 21 and a transformed data feature space 22.

In the transformed data feature space 22, explanatory vectors 25-1, 25-2, 25-3, and 25-4, which are vectors indicating a direction in which a prediction value greatly varies, are respectively given to the point u, the point v1, the point v2, and the point v3. In addition, in the transformed data feature space 22, an approximation identification line 24 is a boundary line that approximates an identification boundary between the positive example and the negative example. In the input data feature space 21, an identification boundary between the positive example and the negative example of the classifier is not always clear, and thus the approximation identification line is not drawn in the input data feature space 21 in FIG. 3.

Here, a configuration in which estimation of the classification factor as illustrated in FIG. 2 is performed with respect to the vicinity of the point u in FIG. 3 corresponds to a configuration in which an identification factor 26 indicating an identification factor in the vicinity of the point u of the approximation identification line 24 that identifies the positive example and the negative example is estimated.

In a case of estimating the classification factor in the vicinity of the data u, in the input data feature space 21, the point u, the point v1, the point v2, and the point v3 are spaced away from each other, and thus it is not appropriate that the point v3 is treated as a point in the vicinity of the point u in the method of LIME.

In a case of estimating the classification factor by the method of LIME described in "Why Should I Trust You?" Explaining the Predictions of Any Classifier, Marco Tulio Ribeiro et. al., Proceedings of the 22nd ACM SIGKDD International Conference on Knowledge Discovery and Data Mining, August, 2016, a point in the vicinity of the point u within the transformed data feature space 22 is selected, and the classification factor is estimated. Specifically, estimation of the classification factor is performed by an estimator that performs machine learning in a state in which the point v1, the point v2, and the point v3 in the vicinity of the point u in the transformed data feature space 22 are set as learning data. That is, learning is performed in a state in which a point such as the point v3 that exists in the vicinity of the point u in the transformed data feature space 22 but does not exist in the vicinity of the point u in the input data feature space 21 is included in learning data. Accordingly, there is a problem that determination accuracy by an estimation model that is learned deteriorates.

SUMMARY

According to an aspect of the embodiments, a non-transitory computer-readable recording medium stores therein a learning data selection program that causes a computer to execute a process including: extracting a first input data group relating to first input data in correspondence with designation of the first input data included in an input data group input to a machine learning model, the machine learning model classifying or determining transformed data that is transformed from input data; acquiring a first transformed data group of the machine learning model and a first output data group of the machine learning model, respectively, the first transformed data group being input to the machine learning model and corresponding to the first input data group, the first output data group corresponding to the first transformed data group; and selecting learning target data of an estimation model from the first input data group based on a first set of distances and a second set of distances, the estimation model estimating an output factor of classifying or determining by the machine learning model, each of the first set of distances being a distance between the first input data and each piece of data of the first input data group, each of the second set of distances being a distance between the first transformed data and each piece of data of the first transformed data group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a view illustrating an overview of classification of input data by a classifier, and estimation of a classification factor;

FIG. 3 is a view illustrating an overview of input data and transformed data, which are supplied to the classifier, in respective feature spaces;

FIG. 8A is a view illustrating a relationship between input data and intermediate data which relate to selection data u;

FIG. 8B is a view illustrating a relationship between input data and intermediate data which relate to target data v1 to target data v3;

FIG. 9A is a view illustrating a relationship between input data and transformed data which relate to the selection data u;

FIG. 9B is a view illustrating a relationship between input data and transformed data which relate to the target data v1 to the target data v3;

FIG. 10 is a view illustrating a distance between the selection data u and the target data v1 to the target data v3 in the respective feature spaces;

FIG. 18 is a view illustrating a calculation example of similarity between a plurality of pieces of intermediate data generated by using a transformation matrix;

FIG. 19 is a view illustrating an update example of the transformation matrix of "term S";

FIG. 25 is a first view illustrating a comparison example of similarity calculation;

FIG. 26 is a second view illustrating a comparison example of the similarity calculation;

FIG. 28 is a second view illustrating the similarity calculation example.

DESCRIPTION OF EMBODIMENTS

Preferred embodiments will be explained with reference to accompanying drawings. Furthermore, respective embodiments can be executed in combination of a plurality of the embodiments in a compatible range.

[a] First Embodiment

Figure 1:
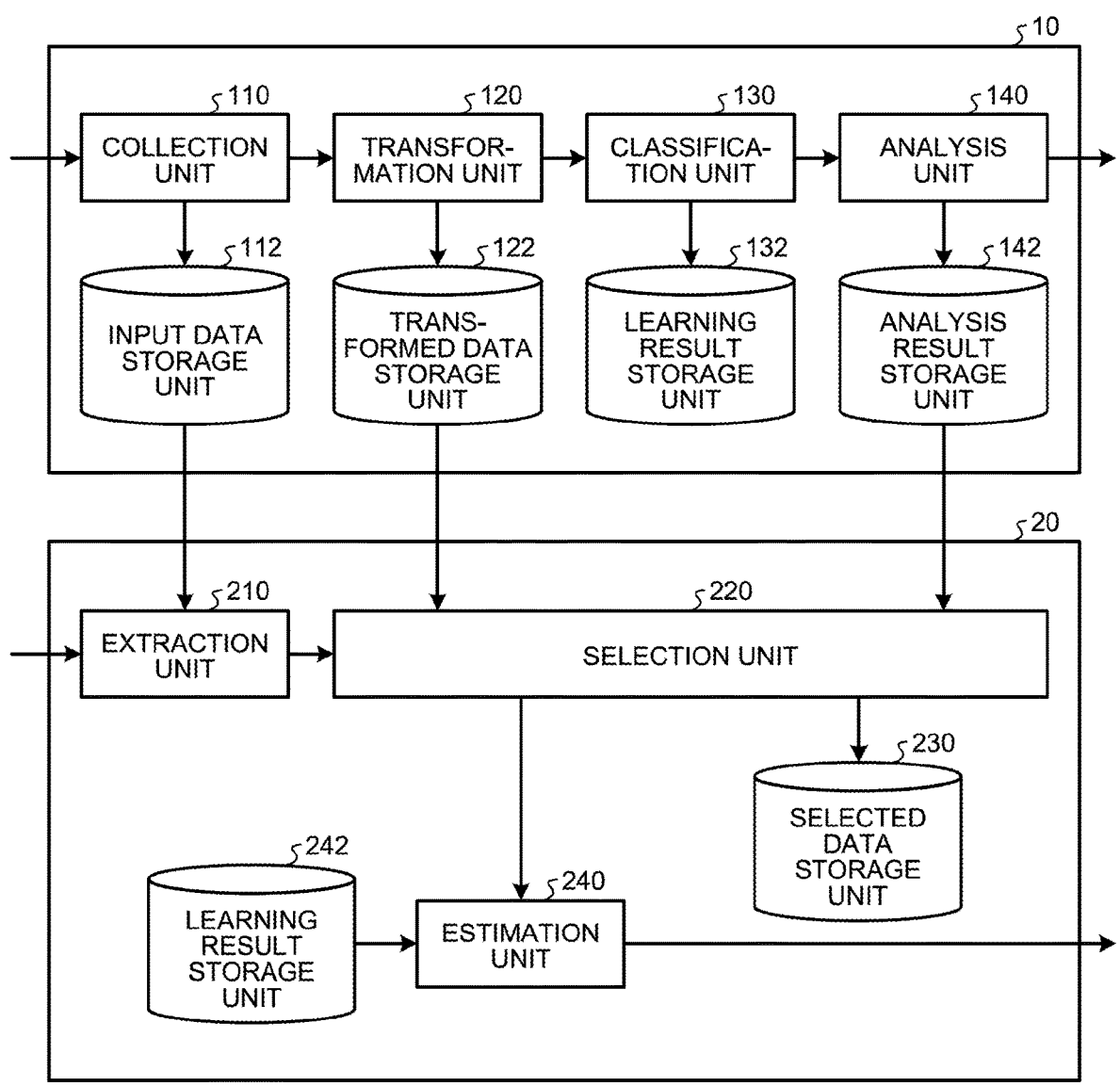
FIG. 1 is a view illustrating a configuration example of a classification device and a factor estimation device according to a first embodiment.

FIG. 1 is a view illustrating a configuration example of a classification device 10 and a factor estimation device 20 according to a first embodiment. The classification device 10 includes a collection unit 110, an input data storage unit 112, a transformation unit 120, a transformed data storage unit 122, a classification unit 130, a learning result storage unit 132, an analysis unit 140, and an analysis result storage unit 142.

The factor estimation device 20 includes an extraction unit 210, a selection unit 220, a selected data storage unit 230, an estimation unit 240, and a learning result storage unit 242. For example, when a computer executes a learning data selection program, the factor estimation device 20 capable of executing a learning data selection method is realized.

In the classification device 10, the collection unit 110 collects input data, and stores the input data in the input data storage unit 112. For example, a plurality of pieces of input data including the input data u, the input data v1, v2, and v3 in the input data feature space 21 illustrated in FIG. 3 are stored in the input data storage unit 112. The transformation unit 120 transforms the input data collected by the collection unit 110 by a predetermined method, and stores the resultant transformed data in the transformed data storage unit 122. For example, the input data u, v1, v2, and v3 in the input data feature space 21 illustrated in FIG. 3 are respectively transformed into u, v1, v2, and v3 in the transformed data feature space 22. For example, the predetermined method represents a method in which a dimension, a value, and the like of the input data are transformed so that classification in the classification unit 130 is appropriately performed, and linear transformation, nonlinear transformation, unidirectional transformation, bidirectional transformation, and the like can be used as the method. The transformed data that is transformed by the transformation unit 120 is input to the classification unit 130. The transformation unit 120 performs classification by using learning parameters stored in the learning result storage unit 132, and outputs the classification result to the analysis unit 140.

In the factor estimation device 20, the extraction unit 210 receives designation of input data that becomes a factor estimation target, for example, from a user, and acquires related data from the input data storage unit 112 of the classification device 10. With regard to data acquired by the extraction unit 210, the selection unit 220 acquires the transformed data from the transformed data storage unit 122 of the classification device 10, and the analysis result corresponding to the transformed data from the analysis result storage unit 142 of the classification device 10, and selects learning data that becomes a learning target of the estimation unit 240. The estimation unit 240 performs learning based on the learning data that is selected by the selection unit 220, and stores learning parameters in the learning result storage unit 242.

Figure 4:
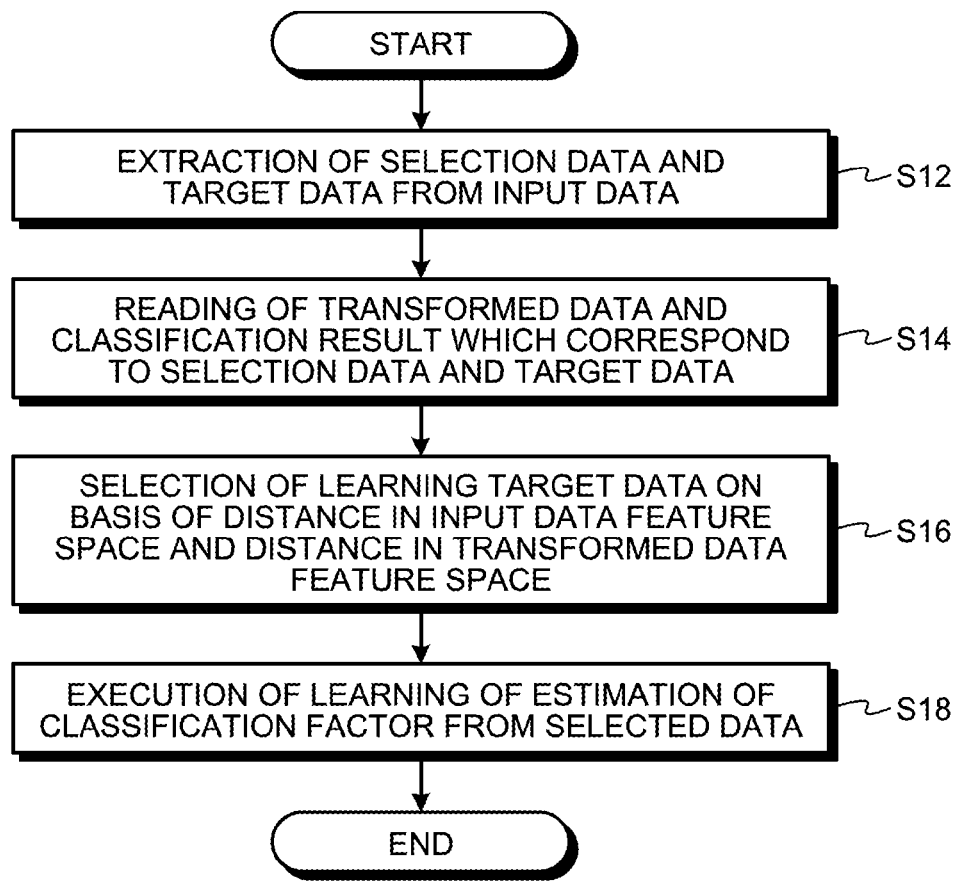
FIG. 4 is a flowchart illustrating an example of a procedure according to the first embodiment.

FIG. 4 is a flowchart illustrating an example of a procedure according to the first embodiment. The extraction unit 210 of the factor estimation device 20 illustrated in FIG. 1 receives designation of the input data u corresponding to the point u illustrated in FIG. 3 as selection data that is input data that becomes a factor estimation target, for example, from a user. In correspondence with the reception of designation of the input data u, the extraction unit 210 extracts the input data v1 to v3 as target data corresponding to the point v1 to the point v3 illustrated in FIG. 3 from the input data storage unit 112 of the classification device 10 in accordance with a predetermined reference (S12). For example, the predetermined reference may be a reference in which a collection timing of the input data has a predetermined relationship with the selection data u, specifically, a data collection period is before and after one hour with the selection data u. In addition, for example, the predetermined reference may be a reference in which a data generation source has a predetermined relationship with the selection data u, specifically, the target data is acquired from the same server.

Next, after receiving the extracted selection data and target data from the extraction unit 210, the selection unit 220 reads transformed data and a classification result which correspond to the selection data u and the target data v1 to v3 from the transformed data storage unit 122 and the analysis result storage unit 142 of the classification device 10 (S14).

Next, the selection unit 220 calculates a distance between the selection data u and the target data v1 to v3 in the input data feature space and a distance therebetween in the transformed data feature space, and selects learning target data based on the distances (S16).

In the selection data u and the target data v1 to v3 illustrated in FIG. 3, a distance between the point u and the point v3 is greater than a distance between the point u, the point v1, and the point v2 in the input data feature space 21. On the other hand, in the transformed data feature space 22, the distance between the point u and the points v1 to v3 does not greatly vary.

That is, among the points v1 to v3 which exist in the vicinity of the point u in the transformed data feature space 22, the point v3 does not exist in the vicinity of the point u in the input data feature space 21. Accordingly, the target data v3 is not appropriate as learning data of the estimation unit 240 that estimates the classification factor.

When obtaining the sum of a distance from the point u in the input data feature space 21 and a distance from the point u in the transformed data feature space 22, the sum of the distances of the target data v3 is greater than the sum of the distances of the target data v1, or the sum of the distances of the selection data v2. Accordingly, based on a calculation result of the sum of distances, the target data v3 is excluded, and the target data v1 and v2 can be selected as a learning target.

Next, learning is performed in the estimation unit 240 by using the selected data (S18). That is, in the estimation unit 240, learning based on input data, transformed data, and a classification result of the selection data u and the target data v1 and v2 is performed, and learning parameters corresponding to the learning result is stored in the learning result storage unit 242.

Figure 5:
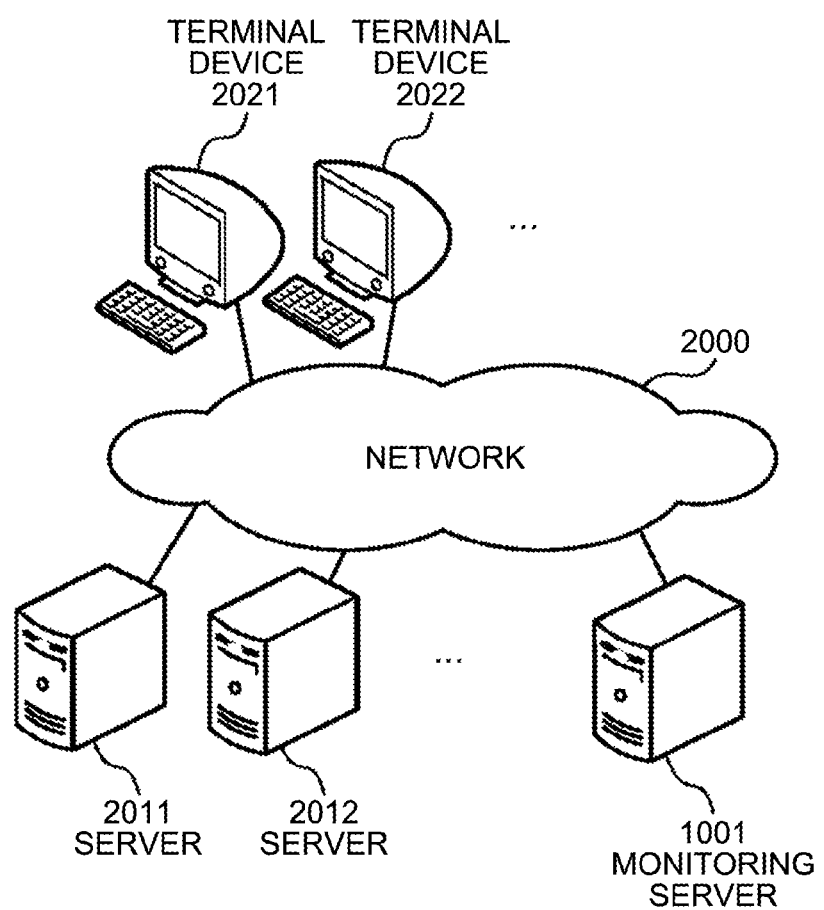
FIG. 5 is a view illustrating a system configuration example of the first embodiment.

FIG. 5 is a view illustrating a system configuration example of the first embodiment. A plurality of servers 2011, 2012, . . . , a plurality of terminal devices 2021, 2022, . . . , and a monitoring server 1001 are connected to a network 2000. The plurality of servers 2011, 2012, . . . are computers which perform processing corresponding to a request from any one of the terminal devices. Two or more servers among the plurality of servers 2011, 2012, . . . may perform processing in corporation with each other. The plurality of terminal devices 2021, 2022, . . . are computers which are used by a user who uses a service provided by the plurality of servers 2011, 2012, . . . .

The monitoring server 1001 monitors communication performed through the network 2000 and records a communication log. The monitoring server 1001 classifies data of the communication log for every unit time zone. For example, the monitoring server 1001 classifies data in correspondence with presence or absence of unauthorized communication in a corresponding unit time zone.

The collection unit 110 of the classification device 10 that operates on the monitoring server 1001 acquires communication information such as a packet that is transmitted and received through the network 2000. For example, through a mirroring port of a switch provided in the network 2000, the collection unit 110 acquires a packet that is communicated through the switch. In addition, the collection unit 110 may acquire a communication log of the server from the respective servers 2011, 2012, . . . . The collection unit 110 stores a log (communication log) of the communication information that is acquired in the input data storage unit 112.

On the other hand, a line that connects respective elements illustrated in FIG. 5 represents a part of communication paths, and a communication path other than the communication paths illustrated in the drawing can be set. In addition, a function of each of the elements illustrated in FIG. 5 can be realized, for example, by allowing a computer to execute a program module corresponding to the element.

Figure 6:
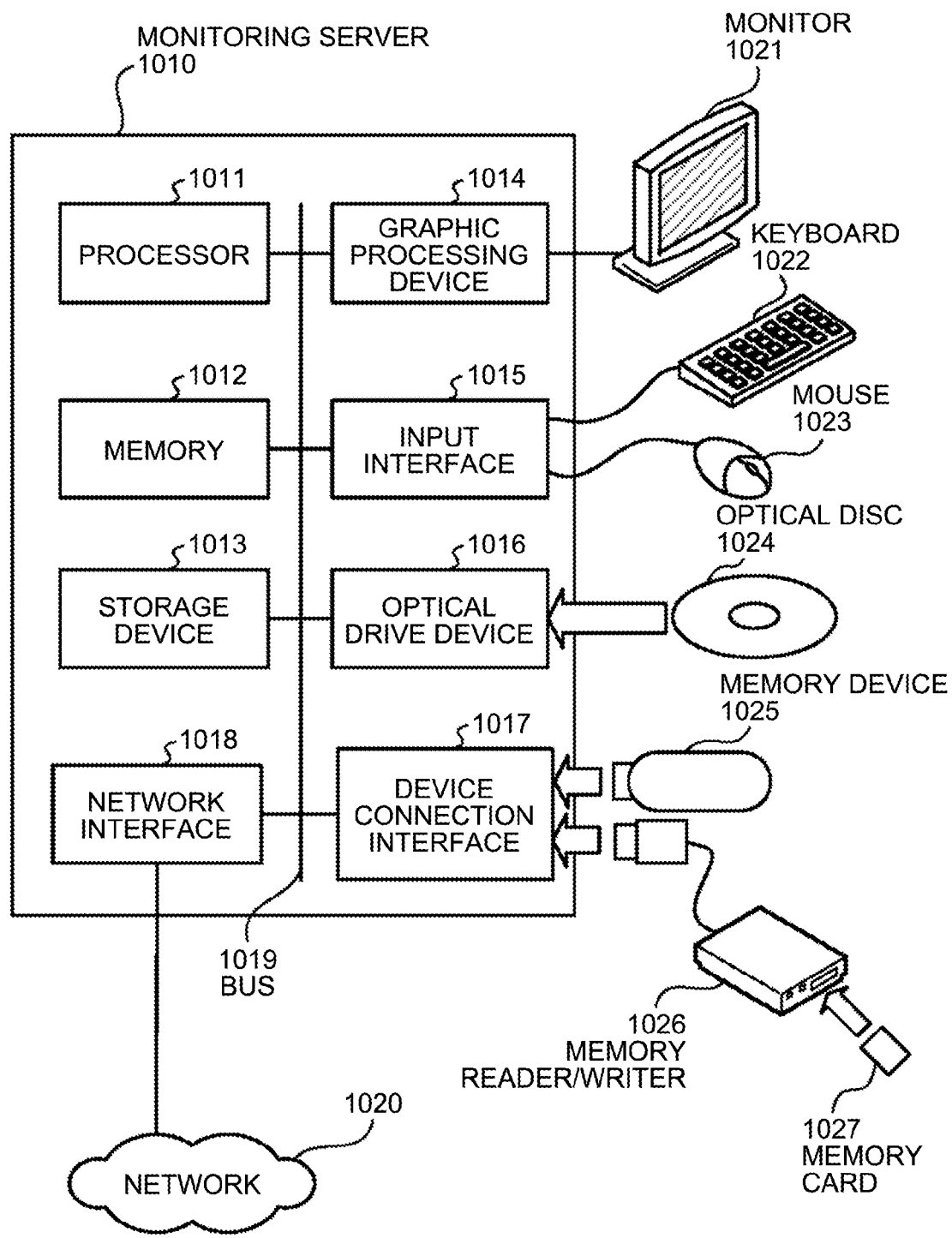
FIG. 6 is a view illustrating a configuration example of hardware of a monitoring server that is used in the first embodiment.

FIG. 6 is a view illustrating a configuration example of hardware of a monitoring server that is used in the first embodiment. In the monitoring server 1010, the entirety of a device is controlled by a processor 1011. A memory 1012 and a plurality of peripherals are connected to the processor 1011 through a bus 1019. The processor 1011 may be a multiprocessor. For example, the processor 1011 is a central processing unit (CPU), a micro processing unit (MPU), or a digital signal processor (DSP). At least a part of functions which are realized when the processor 1011 executes a program may be realized by an electronic circuit such as an application specific integrated circuit (ASIC) and a programmable logic device (PLD).

The memory 1012 is used as a main storage device of the monitoring server 1010. At least a part of a program of an operating system (OS) or an application program which is executed by the processor 1011 is temporarily stored in the memory 1012. In addition, various pieces of data for processing by the processor 1011 are stored in the memory 1012. As the memory 1012, for example, a volatile semiconductor storage device such as a random access memory (RAM) is used.

The peripherals which are connected to the bus 1019 include a storage device 1013, a graphic processing device 1014, an input interface 1015, an optical drive device 1016, a device connection interface 1017, and a network interface 1018.

The storage device 1013 electrically or magnetically performs data writing and reading with respect to a built-in recording medium. The storage device 1013 is used as an auxiliary storage device of a computer. A program of an OS, an application program, and various pieces of data are stored in the storage device 1013. On the other hand, as the storage device 1013, for example, a hard disk drive (HDD) or a solid state drive (SSD) can be used.

A monitor 1021 is connected to the graphic processing device 1014. The graphic processing device 1014 displays an image on a screen of the monitor 1021 in accordance with a command from the processor 1011. Examples of the monitor 1021 include a display device using a cathode ray tube (CRT), a liquid crystal display device, and the like.

A keyboard 1022 and a mouse 1023 are connected to the input interface 1015. The input interface 1015 transmits a signal that is transmitted from the keyboard 1022 or the mouse 1023 to the processor 1011. On the other hand, the mouse 1023 is an example of a pointing device, and other pointing devices may be used. Examples of the other pointing devices include a touch panel, a tablet, a touch pad, a track ball, and the like.

The optical drive device 1016 reads data that is recorded on an optical disc 1024 by using laser light and the like. The optical disc 1024 is a portable recording medium on which data is recorded in a readable manner by reflection of light. Examples of the optical disc 1024 include a digital versatile disc (DVD), a DVD-RAM, a compact disc read only memory (CD-ROM), a CD recordable (R)/rewritable (RW), and the like.

The device connection interface 1017 is a communication interface that connects the peripherals to the monitoring server 1010. For example, a memory device 1025 or a memory reader/writer 1026 can be connected to the device connection interface 1017. The memory device 1025 is a recording medium provided with a communication function with the device connection interface 1017. The memory reader/writer 1026 is a device that writes data in a memory card 1027 or reads out data from the memory card 1027. The memory card 1027 is a card-type recording medium.

The network interface 1018 is connected to the network 1020. The network interface 1018 transmits or receives data to and from another computer or a communication device through the network 1020.

A processing function of the first embodiment can be realized by the above-described hardware configuration.

The monitoring server 1010 realizes a processing function of the first embodiment, for example, when a computer executes a program recorded in a computer-readable recording medium. A program that describes processing contents executed by the monitoring server 1010 can be recorded in various recording media. For example, the program executed by the monitoring server 1010 may be stored in the storage device 1013. The processor 1011 loads at least a part of programs in the storage device 1013 in the memory 1012, and executes the program. In addition, the program executed by the monitoring server 1010 may be recorded in a portable recording medium such as the optical disc 1024, the memory device 1025, and the memory card 1027. For example, the program stored in the portable recording medium can be executed after being installed in the storage device 1013 by a control from the processor 1011. In addition, the processor 1011 can directly read out the program from the portable recording medium for execution.

The processing function of the first embodiment can be realized by the above-described hardware configuration.

[b] Second Embodiment

Next, a second embodiment will be described.

Figure 7:
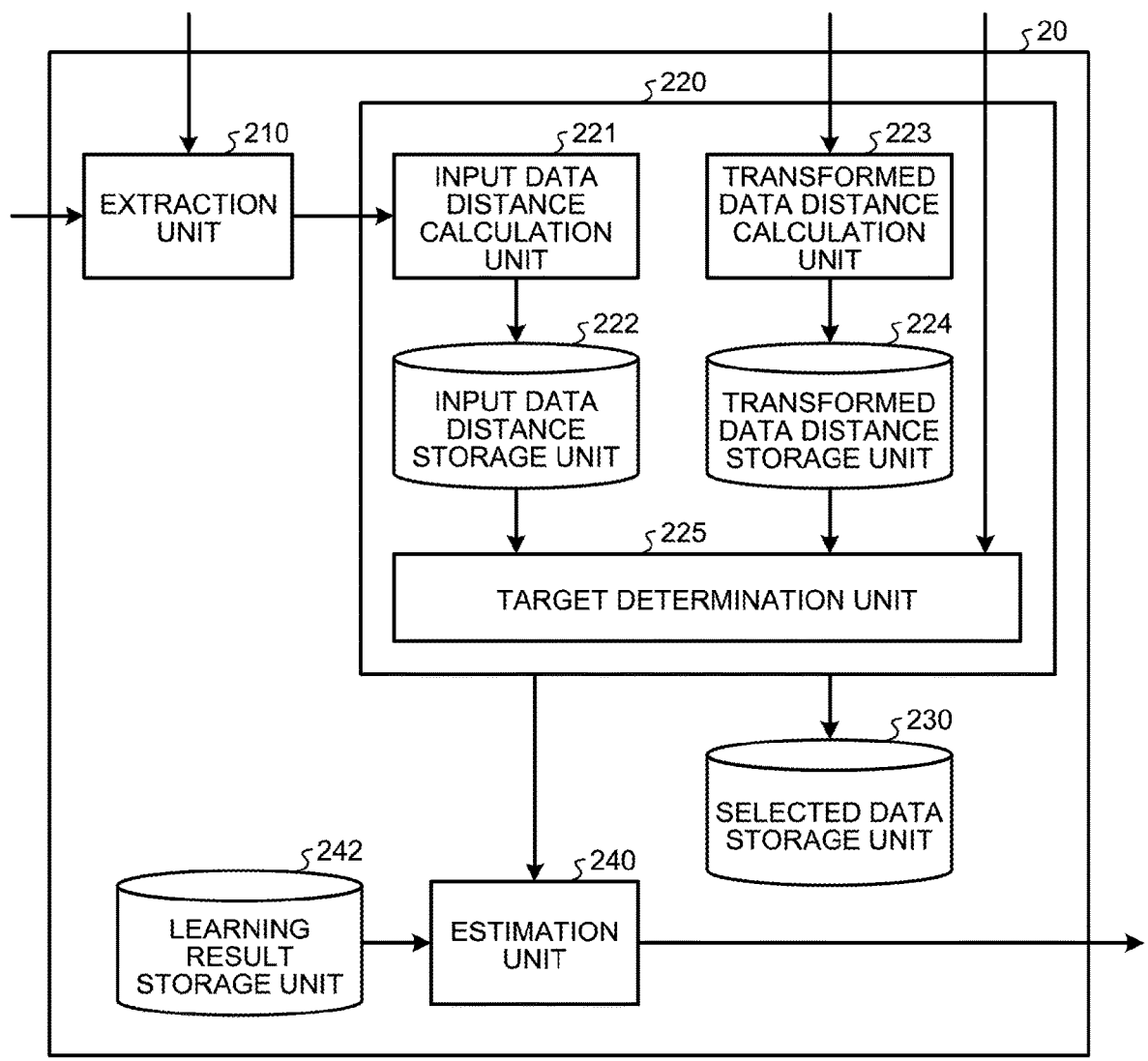
FIG. 7 is a view illustrating a configuration example of a factor estimation device according to a second embodiment.

FIG. 7 is a view illustrating a configuration example of a factor estimation device according to the second embodiment. In a factor estimation device 20 according to the second embodiment as illustrated in FIG. 7, description portions having the same operation as in the factor estimation device 20 according to the first embodiment will not be repeated.

The selection unit 220 of the factor estimation device 20 according to the second embodiment includes an input data distance calculation unit 221, an input data distance storage unit 222, a transformed data distance calculation unit 223, a transformed data distance storage unit 224, and a target determination unit 225.

Figure 11:
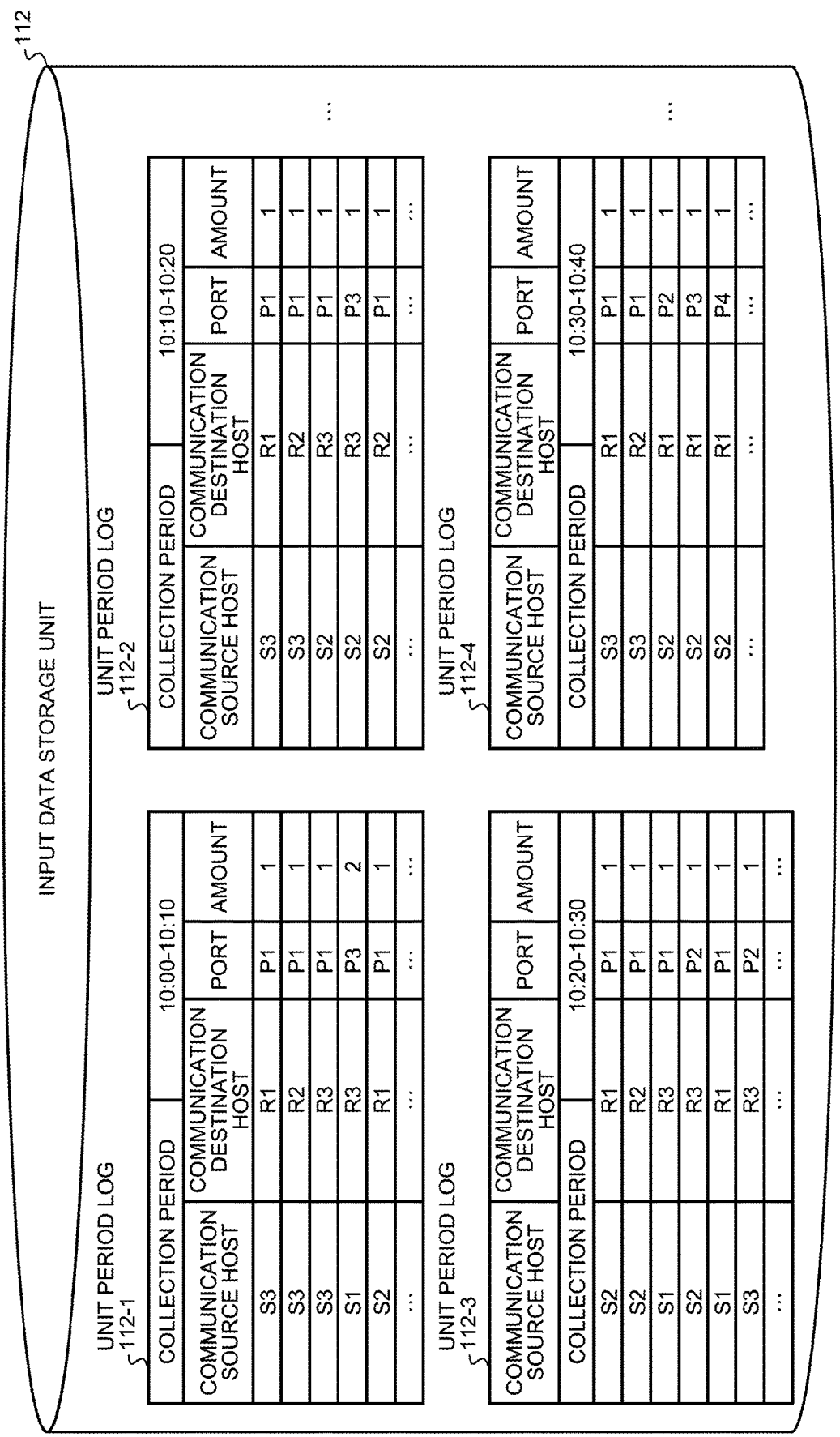
FIG. 11 is a view illustrating an example of an input data storage unit according to the second embodiment.

FIG. 11 is a view illustrating an example of an input data storage unit in the second embodiment. A plurality of unit period logs 112-1, 112-2, . . . are stored in the input data storage unit 112 included in the classification device 10 illustrated in FIG. 1. A collection period of a communication log is shown in each of the unit period logs 112-1, 112-2, . . . . For example, a collection period of the unit period log 112-1 is 10:00 to 10:10, and a collection period of the unit period log 112-2 is 10:10 to 10:20. Communication information collected in a time zone shown in the collection period is stored in the unit period logs 112-1, 112-2, . . . .

Respective records, which are stored in the unit period logs 112-1, 112-2, . . . , include a communication source host, a communication destination host, a port, and an amount. The communication source host is an identifier of a device that is a packet transmission source. The communication destination host is an identifier of a device that is a packet transmission destination. The port is an identifier of a communication port number in which communication is performed between the communication source host and the communication destination host. The amount in the unit period log 112-1 is a value with respect to a combination of the communication source host, the communication destination host, and the port. For example, the amount is the number of times of communication in the same set of the communication source host, the communication destination host, and the port.

Figure 12:
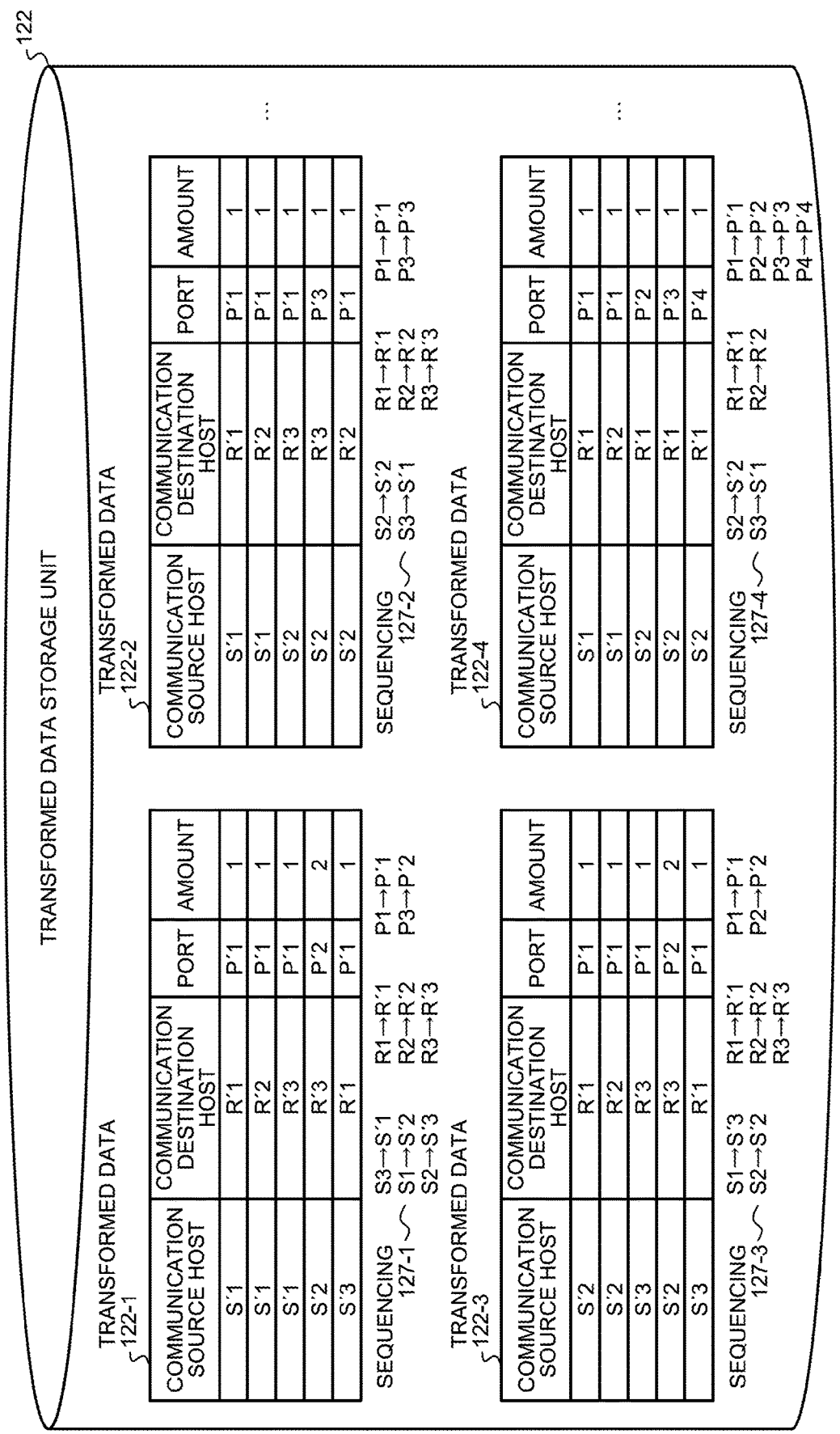
FIG. 12 is a view illustrating an example of a transformed data storage unit according to the second embodiment.

FIG. 12 is a view illustrating an example of a transformed data storage unit in the second embodiment. The transformed data storage unit 122 included in the classification device 10 illustrated in FIG. 1 stores transformed data tables 122-1, 122-2, . . . . The respective transformed data tables 122-1, 122-2, . . . are data that is transformed from the unit period logs 112-1, 112-2, . . . stored in the input data storage unit 112 through transformation corresponding to the learning and classification in the classification unit 130.

The unit period logs 112-1, 112-2, . . . stored in the input data storage unit 112 are transformed into the transformed data tables 122-1, 122-2, . . . by sequencing 127-1, sequencing 127-2, . . . which are shown below respective pieces of transformed data in FIG. 12.

At a learning stage of the classification device 10, learning parameters of the classification unit 130 and each sequencing are set to a value and a relationship which correspond to a learning result.

Figure 13:
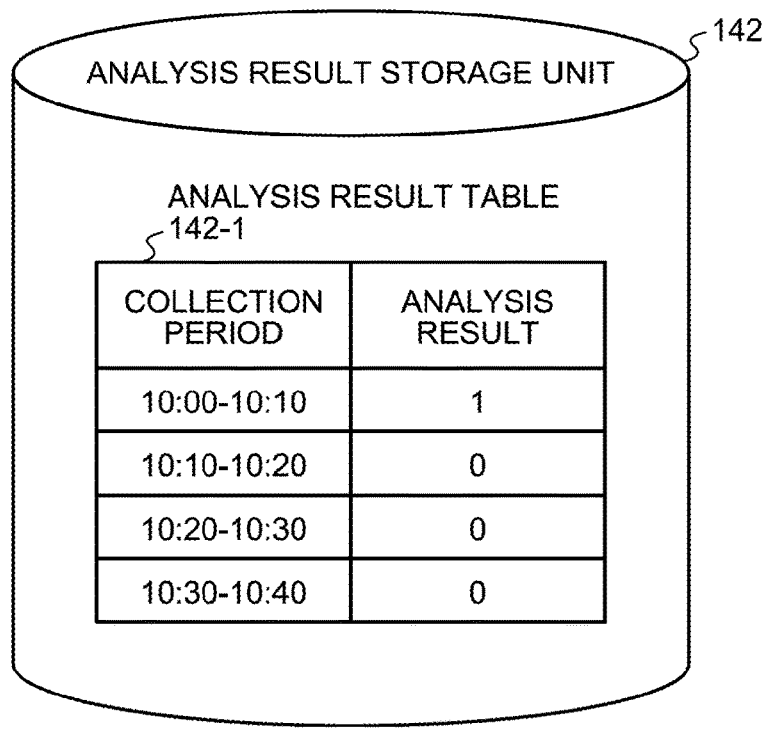
FIG. 13 is a view illustrating an example of an analysis result storage unit according to the second embodiment.

FIG. 13 is a view illustrating an example of an analysis result storage unit in the second embodiment. The analysis result storage unit 142 included in the classification device 10 illustrated in FIG. 1 stores an analysis result corresponding to a classification result by the classification unit 130 for each of the unit period logs 112-1, 112-2, . . . which are different in a collection period stored in the input data storage unit 112. For example, the unit period log 112-1 in which the collection period stored in the input data storage unit 112 in FIG. 11 is 10:00 to 10:10 is stored in an analysis result table 142-1 illustrated in FIG. 13 in a state in which an analysis result based on the classification result by the classification unit 130 is set to 1 (has a problem).

Figure 16:
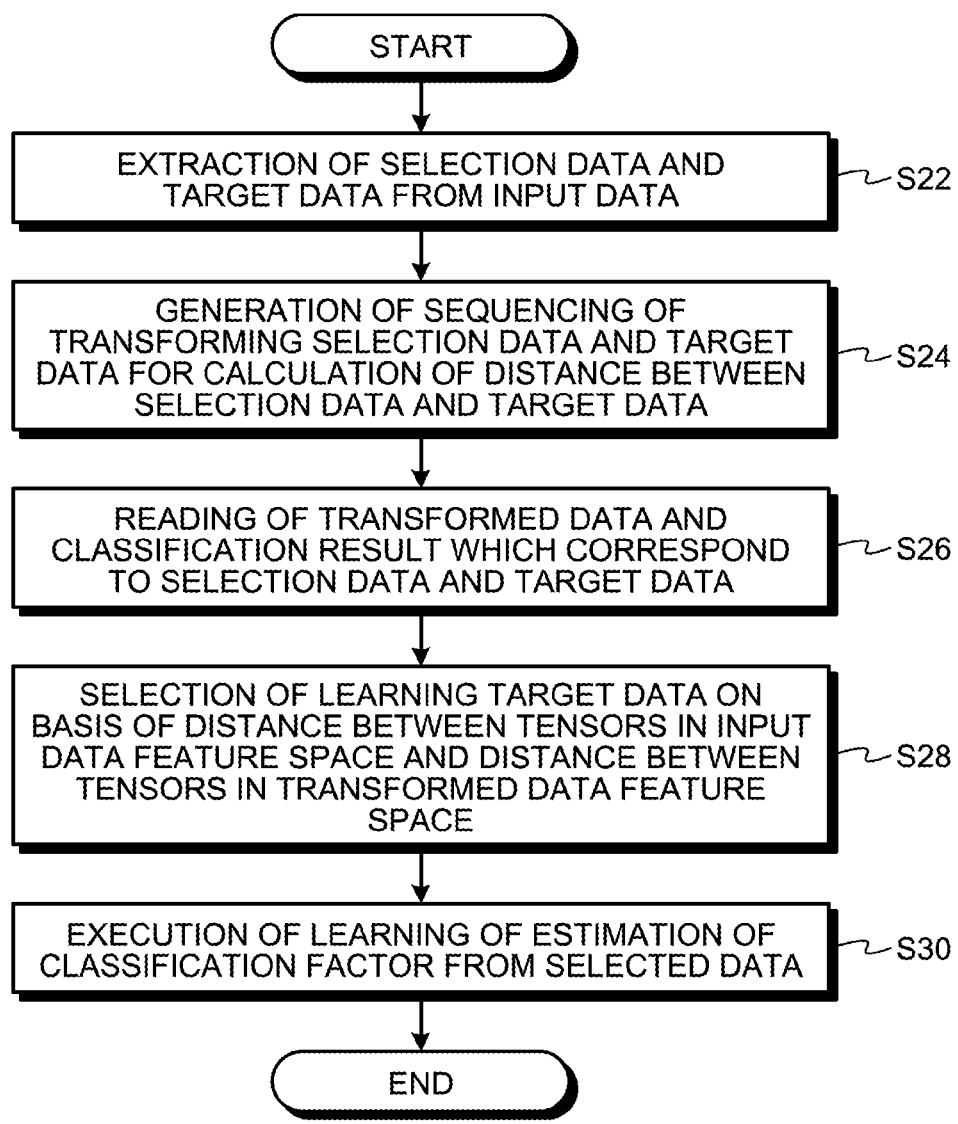
FIG. 16 is a flowchart illustrating an example of a procedure according to the second embodiment.

FIG. 16 is a flowchart illustrating an example of a procedure according to the second embodiment. Hereinafter, description will be given of a learning target data selection sequence by the selection unit 220 of the factor estimation device 20 in the second embodiment with reference to the flowchart illustrated in FIG. 16, FIG. 8A, FIG. 8B, FIG. 9A, FIG. 9B, and FIG. 10.

The extraction unit 210 of the factor estimation device 20 illustrated in FIG. 7 receives designation of the unit period log 112-1 in which the collection period illustrated in FIG. 11 is 10:00 to 10:10 as the selection data u that is input data that becomes a factor estimation target, for example, from a user.

In correspondence with the designation of the selection data u, the extraction unit 210 selects the unit period logs 112-2 to 112-4 illustrated in FIG. 11 in which a beginning period of the collection period is 10:10 to 10:30 that continues to the selection data u as the target data v1 to v3 (S22).

Here, with regard to a target data selection method, data in which the data collection period continues to the selection data u is selected. However, as in the first embodiment, another reference relating to the data collection period, or data in which a data generation source has a predetermined relationship with the selection data u may be selected as the target data. Specifically, acquisition of target data from the same server may be selected as the target data.

Next, with respect to the selection data u and the target data v1 to v3 which are extracted by the extraction unit 210, the input data distance calculation unit 221 generates sequencing of transforming the selection data and the target data (S24). FIG. 8A and FIG. 8B are views illustrating a relationship between input data and intermediate data which relate to the selection data u and the target data v1 to v3. In FIG. 8A and FIG. 8B, input data 801 of the selection data u, and input data 811 to 831 of the target data v1 to v3 are transformed into intermediate data 805 to 835 by sequencing 803 to sequencing 833. A calculation method of the sequencing 803 to the sequencing 833 will be described later with reference to FIG. 17 to FIG. 28.

Through calculation of the sequencing 803 to the sequencing 833, input data 801 of the selection data u, and input data 811 to 831 of the target data v1 to v3 are transformed into intermediate data 805 to 835, and it is possible to obtain distances between the selection data u and the target data v1 to v3 in the input data feature space 21.

For example, a distance between the selection data u and the target data v1 in the input data feature space 21 is calculated by obtaining a distance between the intermediate data 805 and the intermediate data 815.

A calculation example relating to the intermediate data 805 and the intermediate data 815 is as follows.

a) One item of (S'2, R'3, P'2) exists in both u and v1 and is different in an amount, and thus $(2-1)^2=2$.

b) Two items of (S'1, R'3, P'1) and (S'3, R'1, P'1) exist only in u, and $1^2+1^2=2$.

c) Two items of (S'2, R'3, P'1) and (S'2, R'2, P'1) exist only in v1, and $1^2+1^2=2$. Accordingly, the sum of a), b), and c) becomes 5.

Similarly, distances between the selection data u and the target data v1 to v3 in the input data feature space 21 respectively become 5, 4, and 9 through calculation.

Next, after receiving the extracted selection data and target data from the extraction unit 210, the selection unit 220 reads transformed data and a classification result which correspond to the selection data u and the target data v1 to v3 from the transformed data storage unit 122 and the analysis result storage unit 142 of the classification device 10 illustrated in FIG. 1 (S26).

Next, learning target data is selected based on a distance between tensors in the input data feature space 21 and a distance between tensors in the transformed data feature space 22 (S28). FIG. 9A and FIG. 9B are views illustrating a relationship between input data and transformed data which relate to the selection data u and the target data v1 to v3. In FIG. 9A and FIG. 9B, input data 901 of the selection data u, and input data 911 to 931 of the target data v1 to v3 are transformed into transformed data 905 to 935 through sequencing 903 to sequencing 933 by the transformation unit 120 of the classification device 10.

As in the distance calculation in the input data feature space 21, distances between the selection data u and the target data v1 to v3 in the transformed data feature space 22 are obtained. Distances between the transformed data 905 of the selection data u and the transformed data 915 to 935 of the target data v1 to v3 become 9, 8, and 9, respectively.

Figure 14:
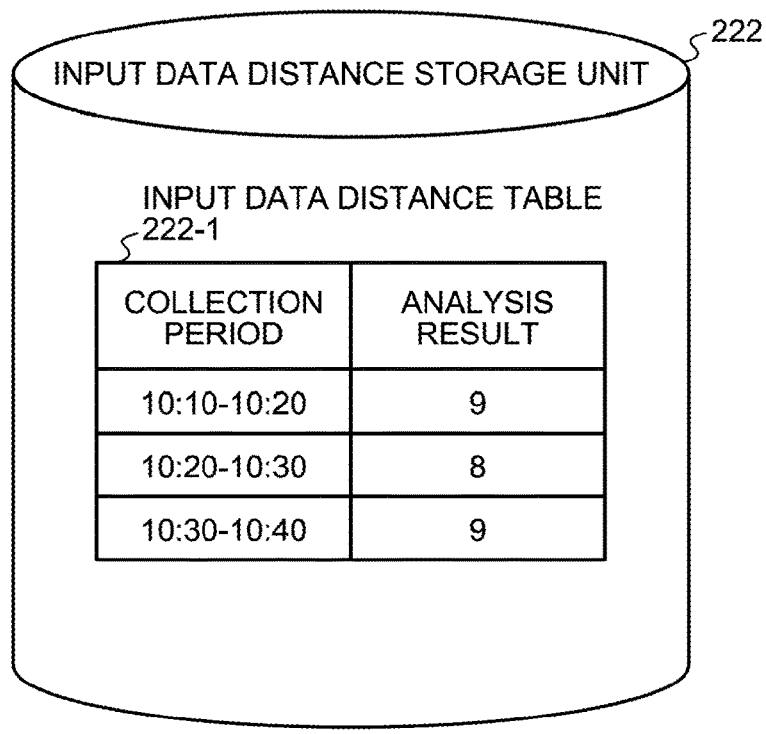
FIG. 14 is a view illustrating an example of an input data distance storage unit according to the second embodiment.

FIG. 14 is a view illustrating an example of the input data distance storage unit 222 according to the second embodiment. In the input data distance storage unit 222, a distance calculated by the input data distance calculation unit is stored as input data distance table 222-1 for every collection period.

Figure 15:
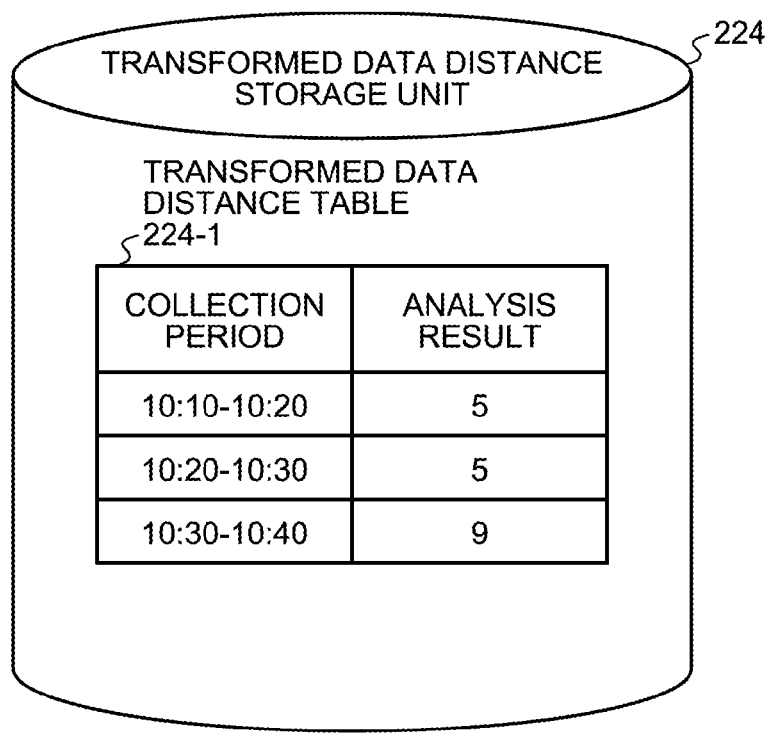
FIG. 15 is a view illustrating an example of a transformed data distance storage unit according to the second embodiment.

FIG. 15 is a view illustrating an example of the transformed data distance storage unit 224 according to the second embodiment. In the transformed data distance storage unit 224, a distance calculated by the transformed data distance calculation unit is stored as transformed data distance table 224-1 for every collection period.

FIG. 10 is a view illustrating a distance between the selection data u and the target data v1 to v3 in respective feature spaces. In FIG. 10, the sum of distances between the selection data u and the target data v1 to v3 in the respective feature spaces become 14, 12, and 18, respectively.

Here, when referring to FIG. 10 and FIG. 3, in the selection data u and the target data v1 to v3, a distance (9) between the point u and the point v3 is greater than a distance (4) between the point u, and the point V1 and point V2 in the input data feature space 21. On the other hand, in the transformed data feature space 22, a distance between the point u and the points v1 to v3 does not greatly vary (9 or 8).

With regard to the target data v1 to v3, when obtaining the sum of distances of the respective feature spaces with respect to the selection data u, as described above, the sum becomes 14, 12, and 18. Accordingly, the target data v3 is further spaced away from the selection data u in comparison to the target data v1 and v2, and is not appropriate as learning data of the estimation unit 240 that estimates a classification factor. Based on the calculation result of the sum of distances, the target data v3 is excluded, and the selection data v1 and v2 can be selected as a learning target.

Figure 17:
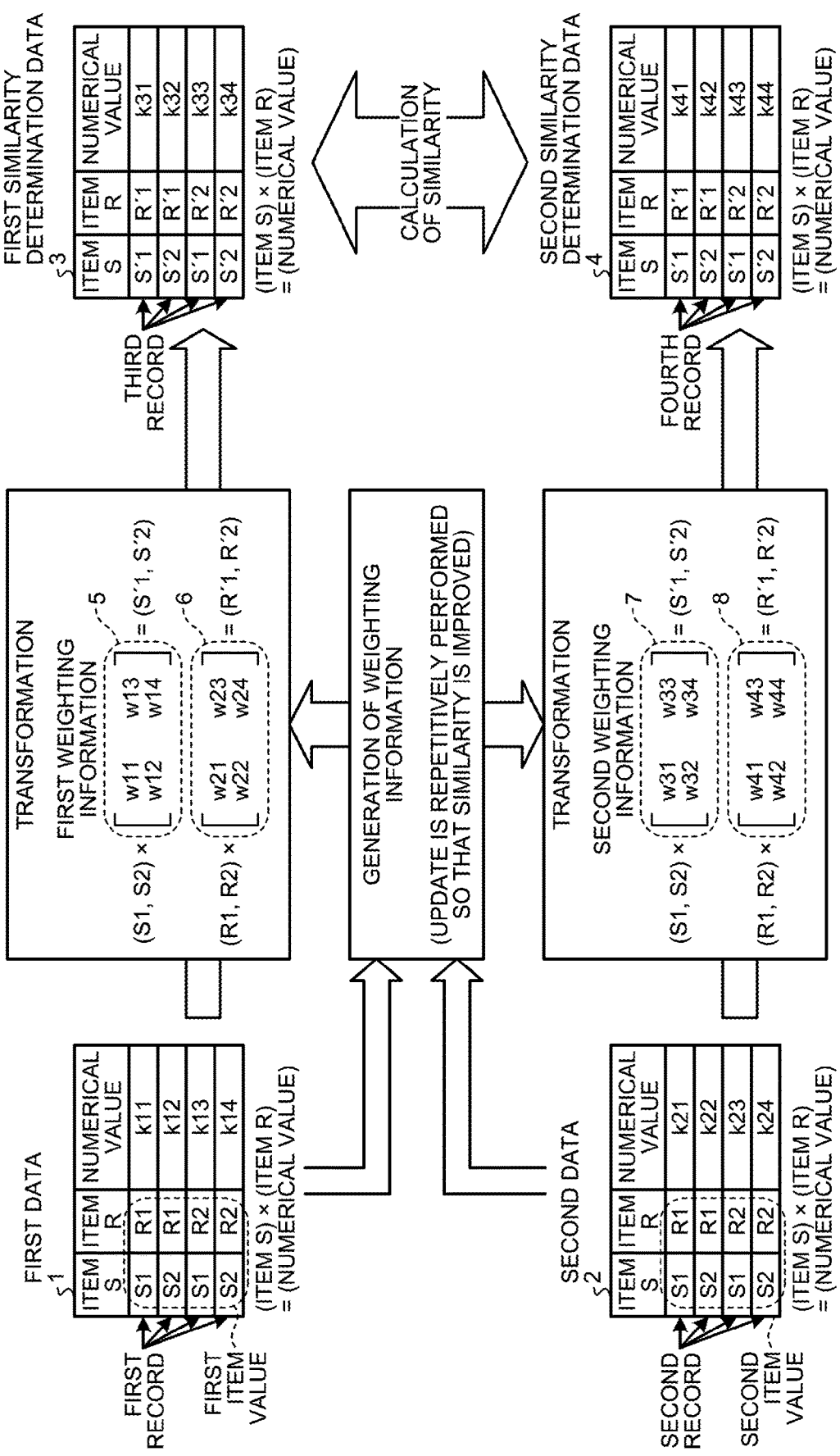
FIG. 17 is a view illustrating an example of distance calculation by an input data distance calculation unit 221 according to the second embodiment.

FIG. 17 is a view illustrating an example of distance calculation in the input data distance calculation unit 221 according to the second embodiment. The input data distance calculation unit 221 calculates a distance based on similarity calculated with respect to input data from the extraction unit 210.

Hereinafter, description will be given of a case where first data 1 and second data 2 for calculation of similarity respectively have two items for simplification. Even in a case where the number of items is 3 or greater, it is possible to calculate the similarity by expanding a matrix in the following description to a tensor.

In FIG. 17, the first data 1 and the second data 2 are similarity calculation targets by the input data distance calculation unit 221. The first data 1 includes a plurality of first records, and each of the first records includes first item values ("S1 or S2" relating to "item S", and "R1 or R2" relating to "item R") relating to "item S and item R" which are first items, and numerical values "k11 to k14" representing relationships between the first item values. Similarly, the second data 2 includes a plurality of second records, and each of the second records includes second item values ("S1 or S2" relating to "item S", and "R1 or R2" relating to "item R") relating to "item S and item R" which are second items, and numerical values "k21 to k24" representing relationships between the second item values.

For every target item, the input data distance calculation unit 221 calculates similarity of a relationship between a target first item value pertaining to the target items in the first data 1 and another first item value, and a relationship between a target second item value pertaining to the target items in the second data 2 and another second item value. Next, first weighting information 5 or 6, and second weighting information 7 or 8 are generated based on the similarity that is calculated. The first weighting information 5 or 6 is information representing the degree of influence of the target first item value on a target transformation destination item value pertaining to a target item among a plurality of transformation destination item values "S'1, S'2, R'1, and R'2" pertaining to any one among a plurality of items "item S, item R". The second weighting information 7 or 8 is information representing the degree of influence of the target second item value on a target transformation destination item value.

For example, when the "item S" is selected as a target item, the input data distance calculation unit 221 generates the first weighting information 5 and the second weighting information 7. At this time, weighting is set to the first weighting information 5 so that relationship similarity with another item is maintained for every pair of the item value "S1 or S2" pertaining to the "item S" in the first data 1, and the item value "S1 or S2" pertaining to the "item S" in the second data 2.

Similarly, weighting is set to the second weighting information 7 so that relationship similarity with another item is maintained for every pair of the item value "S1 or S2" pertaining to the "item S" in the first data 1, and the item value "S1 or S2" pertaining to the "item S" in the second data 2. When the "item R" is selected as a target item, the input data distance calculation unit 221 generates the first weighting information 6 and the second weighting information 8.

In a case of calculating similarity between the target first item value and the target second item value, the input data distance calculation unit 221 generates the first weighting information 5 or 6 and the second weighting information 7 or 8 in which an initial value is set, for example, with respect to each of the plurality of items "item S and item R".

Next, based on another item first weighting information and another item second weighting information which are generated with respect to items other than the target items, the input data distance calculation unit 221 calculates similarity between the target first item value pertaining to the target items in the first data 1 and the second item value pertaining to the target items in the second data 2.

Furthermore, the input data distance calculation unit 221 may particularly determine the plurality of items "item S and item R" as repetitive target items until a predetermined termination condition is satisfied, and may repetitively generate the first weighting information 5 or 6, and the second weighting information 7 or 8 with respect to the target items. For example, the input data distance calculation unit 221 calculates similarity between each of the target first item values and each of the target second item values which pertain to the target items by using another item first weighting information and another item second weighting information which are generated with respect to items other than the target items, and updates the weighting information of the target items in correspondence with the similarity.

Specifically, in a case where the target item is "item S", the input data distance calculation unit 221 calculates similarity between each of the item values "S1 and S2" of the first data 1 and each of the item values "S1 and S2" of the second data 2 by using the first weighting information 6 that is generated with respect to the "item R". Next, the input data distance calculation unit 221 updates the first weighting information 5 and the second weighting information 7 which relate to the "item S" based on the similarity that is calculated. In addition, the input data distance calculation unit 221 updates the first weighting information 6 and the second weighting information 8 which relate to the "item R" by using the first weighting information 5 and the second weighting information 7 after update.

In this manner, when update of the first weighting information 5 or 6, and the second weighting information 7 or 8 is repeated, the first weighting information 5 or 6, and the second weighting information 7 or 8 are optimized so that similarity between first similarity determination data 3 and second similarity determination data 4 is improved.

Next, the input data distance calculation unit 221 transforms the first data 1 into the first similarity determination data 3 based on the first weighting information 5 or 6 that is generated with respect to each of the plurality of items "item S and item R". The first similarity determination data 3 includes a plurality of third records in which numerical values "k31 to k34" representing a relationship between two or more transformation destination item values pertaining to another item among the plurality of transformation destination item values "S'1, S'2, R'1, and R'2". In addition, the input data distance calculation unit 221 transforms the second data 2 into the second similarity determination data 4 based on the second weighting information 7 or 8 that is generated with respect to each of the plurality of items "item S and item R". The second similarity determination data 4 includes a plurality of fourth records in which numerical values "k41 to k44" representing a relationship between two or more transformation destination item values pertaining to another item among the plurality of transformation destination item values "S'1, S'2, R'1, and R'2".

In addition, the input data distance calculation unit 221 calculates similarity between a numerical value group included in the plurality of third records in the first similarity determination data 3, and a numerical value group included in the plurality of fourth records in the second similarity determination data 4. When repetitively generating the first weighting information 5 or 6, and the second weighting information 7 or 8, the input data distance calculation unit 221 calculates the similarity between the numerical value group of the first similarity determination data 3 and the numerical value group of the second similarity determination data 4 whenever generating the first weighting information 5 or 6, and the second weighting information 7 or 8. In addition, the input data distance calculation unit 221 determines that the maximum value of the similarity that is calculated as similarity between the first data 1 and the second data 2.

In this manner, the similarity is calculated after transforming the first data 1 and the second data 2 by using the first weighting information 5 or 6, and the second weighting information 7 or 8, and thus it is possible to calculate similarity with high accuracy. That is, the similarity of relationships between item values pertaining to the same item of the first data 1 and the second data 2 and another item value is reflected on the first weighting information 5 or 6, and the second weighting information 7 or 8 which correspond to the item. According to this, the higher the similarity of the relationships between the item values pertaining to the same item of the first data 1 and the second data 2 and another item value, the higher similarity between the first similarity determination data 3 and the second similarity determination data 4 after transformation becomes. As a result, similarity determination accuracy is improved, and it is possible to calculate a distance between the first data and the second data with accuracy.

In addition, a rapid increase in the amount of calculation like explosion of combination does not occur, and similarity calculation is possible in a typical processing amount. For example, similarity calculation processing can be performed by using a matrix as follows.

The input data distance calculation unit 221 expresses a relationship between an item value of a specific item and another item with a vector. In addition, the input data distance calculation unit 221 transforms the first data 1 and the second data 2 into the first similarity determination data 3 and the second similarity determination data 4 while retaining a distance between vectors corresponding to two item values. At this time, the input data distance calculation unit 221 expresses the first weighting information 5 or 6, and the second weighting information 7 or 8 which are used in the transformation with a matrix. Hereinafter, the matrix representing the first weighting information 5 or 6, and the second weighting information 7 or 8 is referred to as "transformation matrix".

The input data distance calculation unit 221 sets the maximum similarity between the first similarity determination data 3 and the second similarity determination data 4 as similarity between the first data 1 and the second data 2. According to this, it is possible to calculate similarity based on a structure of an intrinsic relation, and it is possible to calculate a distance based on the structure of the intrinsic relation between the first data 1 and the second data 2.

Hereinafter, description will be given of details relating to calculation of similarity by using the transformation matrix. As described above, items of the first data 1 and the second data 2 are set to only two items for simplification. The input data distance calculation unit 221 expresses the first data 1 and the second data 2 with matrices $X_1$ and $X_2$. Rows of the matrices $X_1$ and $X_2$ correspond to respective item values "S1 and S2" of a first item "item S", and columns thereof correspond to respective variable values "R1 and R2" of a second item "item R". Elements (components) of the matrices include a numeral value representing a relationship with an item value with respect to a row and an item value with respect to a column.

Furthermore, in a case where the number of kinds of the item value of the first item "item S" is different between the first data 1 and the second data 2, the input data distance calculation unit 221 adds a dummy item value to data of which the number of kinds of the item value is smaller to make the number of kinds be the same. Similarly, with regard to the second item "item R", the input data distance calculation unit 221 make the number of kinds of the item value be the same.

The input data distance calculation unit 221 expresses the transformation matrices (the first weighting information 5 and the first weighting information 6) relating to the "item S" and "item R" of the first data 1 with square matrices $C_{11}$ and $C_{12}$. Similarly, the input data distance calculation unit 221 expresses the transformation matrices (the second weighting information 7 and the second weighting information 8) relating to the "item S" and "item R" of the second data 2 with square matrices $C_{21}$ and $C_{22}$. However, it is assumed that all of the $C_{11}$, $C_{12}$, $C_{21}$, and $C_{22}$ satisfy the following orthonormal conditions.

$$C_{11}^T C_{11} = C_{21}^T C_{21} = I$$

$$C_{12}^T C_{12} = C_{22}^T C_{22} = I \qquad (1)$$

I represents a unit matrix in which a diagonal component is "1", and the remainder is "0". At this time, column vectors of $X_1$ are set as $x_{1a}$ and $x_{1b}$. $X_{1a}$ and $X_{1b}$ represent a relationship between variable values "a" and "b" of the "item R" and the "item S", and has the following relationship.

$$\|C_{11}^T x_{1a} - C_{11}^T x_{1b}\|^2 = \|x_{1a} - x_{1b}\|^2 \qquad (2)$$

That is, in transformation of $X_1$ by $C_{11}$, a distance between vectors, which represents a relationship of an item value with another item, does not vary. This is also true of $C_{12}$, $C_{21}$, and $C_{22}$.

In update of $C_{11}$ and $C_{21}$, the input data distance calculation unit 221 performs calculation of $C_{11}$ and $C_{21}$ which maximizes similarity between a plurality of pieces of data when fixing $C_{12}$ and $C_{22}$. Similarity $E(X_1, X_2)$ between the plurality of pieces of data is expressed by the following formula.

$$E(X_1, X_2) = (C_{11}{}^T X_1 C_{12}, C_{21}{}^T X_2 C_{22}) \qquad (3)$$

$C_{11}$ and $C_{21}$ which maximize the similarity between the plurality of pieces of data can be calculated by the following singular value decomposition.

$$C_{11} S C_{21}{}^T = X_1 C_{12} C_{22}{}^T X_2{}^T \qquad (4)$$

Here, S represents a square diagonal matrix having a non-negative value.

In this manner, data transformation is efficiently performed by using a matrix, and it is possible to calculate similarity.

At this time, a distance $D(X_1, X_2)$ between the first data 1 and the second data 2 which are respectively expressed by matrices $X_1$ and $X_2$ becomes as follows.

$$D(X_1, X_2) = \|C_{11}{}^T X_1 C_{12}, C_{21}{}^T X_2 C_{22}\| \qquad (5)$$

In the example illustrated in FIG. 17, the first weighting information 5 and the first weighting information 6, and the second weighting information 7 and the second weighting information 8 are expressed with transformation matrices. For example, weighting (w11), which represents an influence of the item value "S1" pertaining to the "item S" of the first data 1 on the transformation destination item value "S'1" pertaining to the "item S", is set to a component of first row and first column of the transformation matrix representing the first weighting information 5. In a case of using the transformation matrix, when multiplying a column vector in which an item value for every item of the first data 1 is set as a component by the transformation matrix from the right, it is possible to obtain a transformation destination item value. For example, when multiplying a row vector (S1, S2) in which an item value pertaining to the "item S" of the first data 1 is set as a component by a transformation matrix representing the first weighting information 5 relating to the "item S" from the right, a row vector (S'1, S'2) representing a transformation destination item value pertaining to the "item S" is obtained.

Similarly, when multiplying a row vector (R1, R2) in which an item value pertaining to the "item R" of the first data 1 is set as a component by a transformation matrix representing the first weighting information 6 relating to the "item R" from the right, a row vector (R'1, R'2) representing a transformation destination item value pertaining to the "item R" is obtained. When multiplying a row vector (S1, S2) in which an item value pertaining to the "item S" of the second data 2 is set as a component by a transformation matrix representing the second weighting information 7 relating to the "item S" from the right, a row vector (S'1, S'2) representing a transformation destination item value pertaining to the "item S" is obtained. When multiplying a row vector (R1, R2) in which an item value pertaining to the "item R" of the second data 2 is set as a component by a transformation matrix representing the second weighting information 8 relating to the "item R" from the right, a row vector (R'1, R'2) representing a transformation destination item value pertaining to the "item R" is obtained.

Here, it is assumed that a multiplication result of an item value of the "item S" and an item value of the "item R" in the same record in the first data 1 and the second data 2 is a value of "numerical value" of the record. Similarly, it is assumed that a multiplication result of an item value of the "item S" and an item value of the "item R" in the same record in the first similarity determination data 3 and the second similarity determination data 4 is a value of "numerical value" of the record. In this manner, it is possible to calculate the values of the "numerical values" of the first similarity determination data 3 and the second similarity determination data 4. For example, a numeral value "k31" corresponding to a set of "S'1" and "R'1" of the first similarity determination data 3 becomes as follows.

$$\begin{aligned}
k31 &= S'1 \times R'1 \\
&= (w11 \times S1 + w12 \times S2) \times (w21 \times R1 + w22 \times R2) \\
&= w11 \times w21 \times S1 \times R1 + w12 \times w21 \times S2 \times R1 + w11 \times \\
&\quad w22 \times S1 \times R2 + w12 \times w22 \times S2 \times R2 \\
&= w11 \times w21 \times k11 + w12 \times w21 \times k12 + w11 \times w22 \times k13 + \\
&\quad w12 \times w22 \times k14
\end{aligned}$$

Values (k31 to k34, and k41 to k44) of the first similarity determination data 3 and the second similarity determination data 4 other than "numerical value" can also be calculated in the same manner.

The input data distance calculation unit 221 compares respective values of "numerical values" of the first similarity determination data 3 and the second similarity determination data 4, and calculates similarity between the first similarity determination data 3 and the second similarity determination data 4. For example, the input data distance calculation unit 221 calculates an inner product of a vector in which a numeral value of each record of the first similarity determination data 3 is set as a component, and a vector in which a numeral value of each record of the second similarity determination data 4 is set as a component, and sets the resultant inner product as similarity.

In this manner, it is possible to calculate the similarity by expressing the first weighting information 5, the first weighting information 6, the second weighting information 7, and the second weighting information 8 with a matrix.

Furthermore, in the above-described calculation example, with regard to items of the first data 1 and the second data 2, only two items are set for simplification. However, in a case where the number of items is larger, it is possible to calculate the similarity by expanding the matrix to a tensor. Furthermore, the matrix is an example of the tensor.

A tensor corresponding to comparison target data is set as $X_m$ or $X_n$ (m and n represent integers for identification of data). When the number of items included in $X_m$ or $X_n$ is k (k is an integer of two or greater), if a transformation matrix is set as $C_k$, transformation of data into similarity determination data can be expressed by the following formula.

$$x_n \prod_k x_k C_k \qquad (6)$$

$X_k$ in Formula (6) represents a mode product of a tensor. A distance between $X_m$ and $X_n$ which are tensors can be expressed by the following formula by using the result of Formula (6).

$$E(X_m, X_n) = \|X_m\|_2 + \|X_n\|_2 - 2\left(X_m, X_n \prod_k x_k C_k\right) \quad (7)$$

A matrix $C_k$ in which a distance expressed in Formula (7) is set to the minimum becomes a transformation matrix. Here, it is assumed that $C_k$ satisfies the following orthonormal condition.

$$\begin{cases} C_k^T C_k = I(I_{kn} \geq I_{km}) \\ C_k C_k^T = I(I_{kn} < I_{km}) \end{cases} \quad (8)$$

$C_k$ for every item can be calculated by alternately repeating the following singular value decomposition for every item.

$$P_k S_k Q_k^T = \left(X_n \prod_{\substack{k'=1,\ldots,K \\ k' \neq k}} x_{k'} C_{k'}\right)^{(k)T} X_m^{(k)} \quad (9)$$

(k) in Formula (9) represents an operation of transforming a tensor into a matrix in which a $k^{th}$ item is set as a column, and the other items are set as rows. A matrix $P_k S_k Q_k^T$ is generated by Formula (9). In addition, a matrix $C_k$ is obtained by using $P_k$ and $Q_k^T$ in accordance with the following formula.

$$C_k = P_k Q_k^T \quad (10)$$

When a transformation matrix is obtained by the above-described calculation and data is transformed, even though the number of items is 3 or greater, it is possible to calculate the similarity in a realistic calculation amount, and thus it is possible to calculate a distance.

FIG. 18 is a view illustrating a calculation example of similarity between a plurality of pieces of intermediate data generated by using a transformation matrix. The input data distance calculation unit 221 generates transformation matrices 1041 to 1044 corresponding to the number of variables other than "amount" with respect to each of first data 1031 and second data 1032. For example, the input data distance calculation unit 221 generates the transformation matrix 1041 corresponding to the "item S" and the transformation matrix 1042 corresponding to the "item R" with respect to the first data 1031. Similarly, the input data distance calculation unit 221 generates the transformation matrix 1043 corresponding to the "item S" and the transformation matrix 1044 corresponding to the "item R" with respect to the second data 1032.

The transformation matrices 1041 to 1044 are matrices of two rows by two columns which satisfy an orthonormal condition. Respective rows of the transformation matrix 1041 are correlated with variable values "S1" and "S2" of the "item S" in the first data 1031. Respective rows of the transformation matrix 1043 are correlated with variable values "S1" and "S2" of the "item S" in the second data 1032. Respective columns of the transformation matrix 1041 are correlated with variable values "S'1" and "S'2" of the "item S" in intermediate data 1051. Respective columns of the transformation matrix 1043 are correlated with variable values "S'1" and "S'2" of the "item S" in intermediate data 1052. Weighting in a case of transforming variable values "S1" and "S2" correlated in a row direction into variable values "S'1" and "S'2" correlated in a column direction is set to each component of the transformation matrices 1041 and 1043.

Respective rows of the transformation matrix 1042 are correlated with variable values "R1" and "R2" of the "item R" in the first data 1031. Respective rows of the transformation matrix 1044 are correlated with variable values "R1" and "R2" of the "item R" in the second data 1032. Respective columns of the transformation matrix 1042 are correlated with variable values "R'1" and "R'2" of the "item R" in the intermediate data 1051. Respective columns of the transformation matrix 1044 are correlated with variable values "R'1" and "R'2" of the "item R" in the intermediate data 1052. Weighting in a case of transforming variable values "R1" and "R2" correlated in a row direction into variable values "R'1" and "R'2" correlated in a column direction is set to each component of the transformation matrices 1042 and 1044.

Furthermore, in the example illustrated in FIG. 18, a value of the weighting set to the transformation matrices 1041 to 1044 is shown only up to a second decimal point. However, actually, it is assumed that a value of a lower digit than the second decimal point also exists.

The input data distance calculation unit 221 transforms the first data 1031 into the intermediate data 1051 by using the transformation matrices 1041 and 1042. An amount corresponding to a combination of a variable value of the "item S" and a variable value of the "item R" is set to the intermediate data 1051. "S'1" or "S'2" is set to the variable value of the "item S" of the intermediate data 1051, and "R'1" or "R'2" is set to the variable value of the "item R".

A value of "amount" of the intermediate data 1051 is a multiplication result of the variable value of the "item S" and the variable value of the "item R". The input data distance calculation unit 221 calculates the value of the "amount" of the intermediate data 1051 by transforming the first data 1031 by the transformation matrices 1041 and 1042. For example, the variable value "S'1" is weighting "−0.68"ב"S1"+weighting "−0.73"ב"S2". The variable value "S'2" is weighting "−0.73"ב"S1"+weighting "0.68"ב"S2". The variable value "R'1" is weighting "−0.32"ב"R1"+weighting "−0.94"ב"R2". The variable value "R'2" is weighting "−0.94"ב"R1"+weighting "0.32"ב"R2".

In this manner, it is possible to express values of the variable values "S'1", "S'2", "R'1", and "R'2" with variable values "S1", "S2", "R1", and "R2", and weighting thereof by using the transformation matrices 1041 and 1042. In this case, when multiplying the variable value "S'1" or "S'2", and the variable value "R'1" or "R'2" together, an item including any one of "S1×R1", "S2×R1", "S1×R2", and "S2×R2" appears. For example, "S1×R1" is expressed by the following formula.

$$S'1 \times R'1 = \{(-0.68 \times S1) + (-0.73 \times S2)\} \times$$
$$\{(-0.32 \times R1) + (-0.94 \times R2)\} =$$
$$(-0.68) \times (-0.32) \times S1 \times R1 + (-0.73) \times (-0.32) \times S2 \times R1 +$$
$$(-0.68) \times (-0.94) \times S1 \times R2 + (-0.73) \times (-0.94) \times S2 \times R2$$

The input data distance calculation unit 221 substitutes the values of "S1×R1", "S2×R1", "S1×R2", and "S2×R2" with values of corresponding "amounts" in the first data 1031. In the example illustrated in FIG. 18, "S1×R1=1", "S2×R1=0", "S1×R2=1", and "S2×R2=1". As a result, a value of the "amount" in the intermediate data 1051 is obtained. Similarly, the input data distance calculation unit 221 transforms the second data 1032 with the transformation matrices 1043 and 1044 to generate the intermediate data 1052.

The input data distance calculation unit 221 calculates similarity between the two pieces of intermediate data 1051 and 1052. For example, the input data distance calculation unit 221 normalizes a vector in which each variable value of the "amount" of the intermediate data 1051 is set as a component, and a vector in which each variable value of the "amount" of the intermediate data 1052 is set as a component to a length of "1", and calculates an inner product. In addition, the input data distance calculation unit 221 sets a result of the inner product as similarity between the two pieces of intermediate data 1051 and 1052.

The similarity between the two pieces of intermediate data 1051 and 1052 calculated as described above depends on weighting that is set to each of the transformation matrices 1041 to 1044. Here, the input data distance calculation unit 221 updates the transformation matrices 1041 to 1044 so that the similarity becomes higher. In the update of the transformation matrices 1041 to 1044, update of the transformation matrices 1041 and 1043 of the "item S", and update of the transformation matrices 1042 and 1044 of the "item R" are alternately performed.

FIG. 19 is a view illustrating an update example of a transformation matrix of the "item S". In a case of updating the transformation matrices 1041 and 1043 of the "item S", the input data distance calculation unit 221 fixes a variable of the "item S", and transforms variables other than the "item S", thereby generating two pieces of intermediate data 1053 and 1054. In the example illustrated in FIG. 19, the input data distance calculation unit 221 transforms variable values "R1" and "R2" of the "item R" by using the transformation matrices 1042 and 1044, and generates the two pieces of intermediate data 1053 and 1054. A value of "amount" of the two pieces of intermediate data 1053 and 1054 is a multiplication result of "S1" or "S2", and "R'1" or "R'2". For example, "S1×R'1" in the intermediate data 1053 of the first data 1031 is expressed as "(−0.32)×S1×R1+(−0.94)×S1×R2" by using weighting shown in the transformation matrix 1042. When a value is set to "S1×R1" and "S1×R2" based on the first data 1031, a value of "S1×R'1" is obtained.

When the two pieces of intermediate data 1053 and 1054 of the first data 1031 and the second data 1032 are generated, the input data distance calculation unit 221 calculates similarity between each of "S1" and "S2" in the intermediate data 1053, and each of "S1" and "S2" in the intermediate data 1054, and generates a similarity matrix 1061. Each row of the similarity matrix 1061 is correlated with a variable value of the "item S" of the first data 1031, and each column of the similarity matrix 1061 is correlated with a variable value of the "item S" of the second data 1032. With regard to a component of the similarity matrix 1061, similarity between a variable value of a column and a variable value of a row in which the component is set is set to the component.

For example, the input data distance calculation unit 221 generate a vector representing a relationship with each variable value of another "item R" with respect to each variable value of the "item S". Specifically, with respect to "S1" of the intermediate data 1053, the input data distance calculation unit 221 generates a vector $v1_1$ in which a value of "amount" representing a relationship between "R'1" and "R'2" is set as a component. Similarly, the input data distance calculation unit 221 generates a vector $v2_1$ with respect to "S2" of the intermediate data 1053. The input data distance calculation unit 221 generates a vector $v1_2$ with respect to "S1" of the intermediate data 1054. The input data distance calculation unit 221 generates a vector $v2_2$ with respect to "S2" of the intermediate data 1054.

The input data distance calculation unit 221 sets an inner product of the vector $v1_1$ and the vector $v1_2$ to the similarity matrix 1061 as similarity between "S1" of the first data 1031 and "S1" of the second data 1032. The input data distance calculation unit 221 sets an inner product of the vector $v1_1$ and the vector $v2_2$ to the similarity matrix 1061 as similarity between "S1" of the first data 1031 and "S2" of the second data 1032. The input data distance calculation unit 221 sets an inner product of the vector $v2_1$ and the vector $v1_2$ to the similarity matrix 1061 as similarity between "S2" of the first data 1031 and "S1" of the second data 1032. The input data distance calculation unit 221 sets an inner product of the vector $v2_1$ and the vector $v2_2$ to the similarity matrix 1061 as similarity between "S2" of the first data 1031 and "S2" of the second data 1032.

The input data distance calculation unit 221 generates a transformation matrix 1041a for "item S" transformation of the first data 1031 and a transformation matrix 1043a for "item S" transformation of the second data 1032 based on the similarity matrix 1061 generated as described above. For example, the input data distance calculation unit 221 generates the transformation matrices 1041a and 1043a so that one matrix obtained by erasing S'1 and S'2 from the transformation matrices 1041a and 1043a is closest to the similarity matrix 1061. Specifically, the input data distance calculation unit 221 performs singular value decomposition with respect to the similarity matrix 1061 to generate the transformation matrices 1041a and 1043a.

The similarity matrix 1061 updates the transformation matrix 1041 for "item S" transformation of the first data 1031 to the transformation matrix 1041a that is generated. In addition, the similarity matrix 1061 updates the transformation matrix 1043 for "item S" transformation of the second data 1032 to the transformation matrix 1043a that is generated.

In this manner, the transformation matrix of the "item S" is updated by fixing the "item S" and transforming the other variables. Next, the input data distance calculation unit 221 updates the transformation matrix of the "item R" by fixing the "item R" and transforming the other variables. When transformation matrices of respective variables are updated, the input data distance calculation unit 221 generates intermediate data of the first data 1031 and intermediate data of the second data 1032 by using the transformation matrices after update, and calculates similarity between the plurality pieces of intermediate data. For example, the input data distance calculation unit 221 repetitively performs update of the transformation matrices until similarity between a plurality of the intermediate data converges. According to this, a transformation matrix capable of obtaining the maximum value of similarity between the plurality of pieces of intermediate data is generated. In addition, the input data distance calculation unit 221 sets the maximum value of the similarity between the plurality of pieces of intermediate data as similarity between the first data 1031 and the second data 1032.

Figure 20:
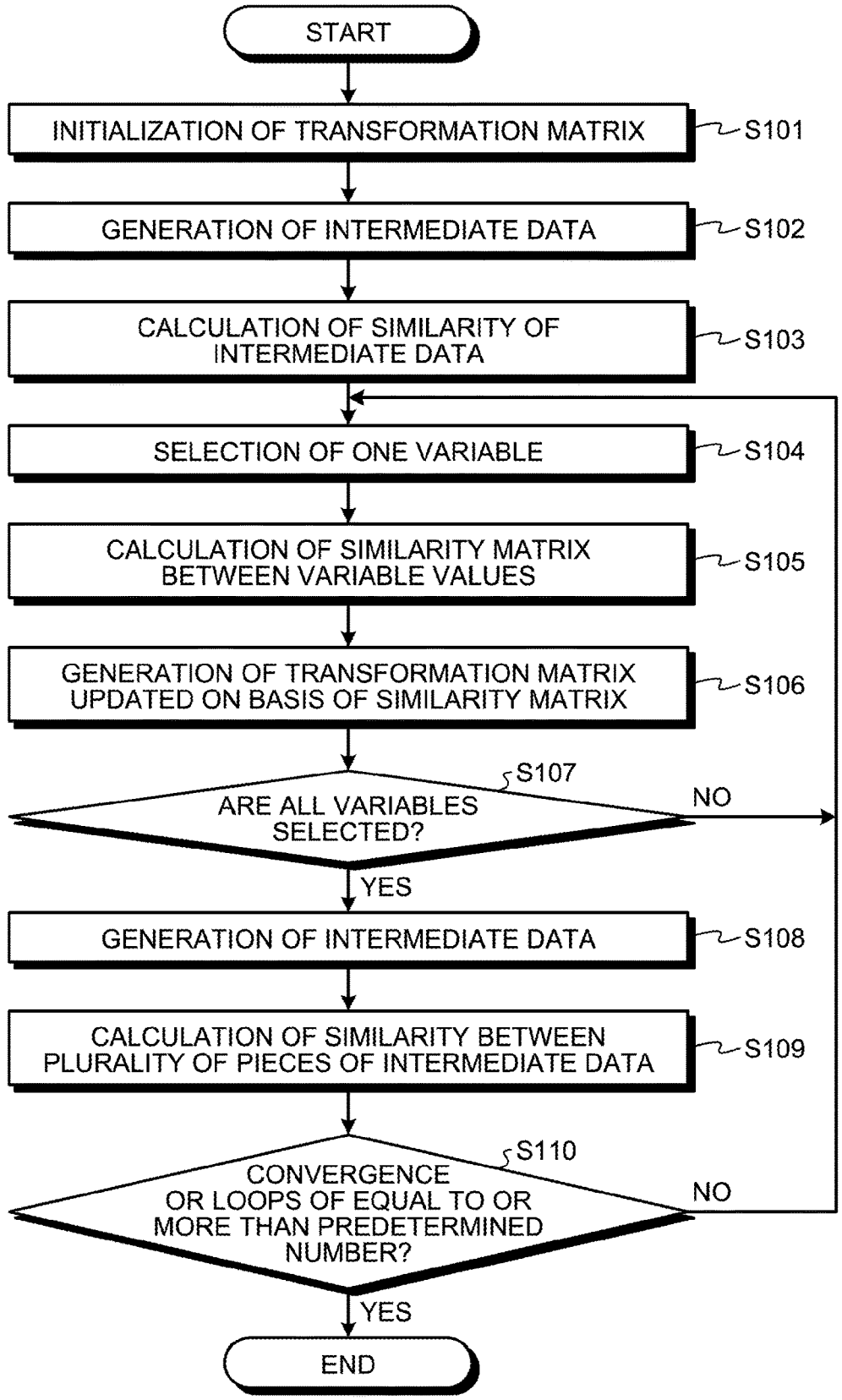
FIG. 20 is a flowchart illustrating an example of a procedure of similarity calculation processing.

When illustrating the procedures illustrated in FIG. 18 and FIG. 19 as a flowchart, a flowchart in FIG. 20 is obtained.

FIG. 20 is a flowchart illustrating an example of a procedure of similarity calculation processing. Hereinafter, the processing illustrated in FIG. 20 will be described in accordance with a step number. The similarity calculation processing is executed when two pieces of data as a similarity comparison target are input.

[Step S101]

The input data distance calculation unit 221 initializes a transformation matrix. For example, the input data distance calculation unit 221 generates a transformation matrix for every variable other than "amount" of classification target data. The transformation matrix that is generated is a square matrix including rows and columns which correspond to the number of variable values included in corresponding variables (the same variable value is counted as 1). An arbitrary value can be set to a component of the transformation matrix as long as orthonormal conditions are satisfied. For example, the input data distance calculation unit 221 randomly determines values of several components in the transformation matrix, and determines values of other components so that the orthonormal conditions are satisfied.

[Step S102]

The input data distance calculation unit 221 generates intermediate data from each comparison target data by using the transformation matrix that is generated.

[Step S103]

The input data distance calculation unit 221 calculates similarity between a plurality of pieces of intermediate data. The input data distance calculation unit 221 temporarily stores the calculated similarity in a memory.

[Step S104]

The input data distance calculation unit 221 selects one among variables of a plurality of pieces of the comparison target data.

[Step S105]

The input data distance calculation unit 221 generates a similarity matrix representing similarity between variable values of the plurality of pieces of comparison target data. For example, the input data distance calculation unit 221 generates intermediate data in which variables other than the selected variable are transformed by the transformation matrix with respect to each of the plurality of pieces of comparison target data. In addition, the input data distance calculation unit 221 sets similarity between a value of the amount of a variable value in the intermediate data and a value of the amount of a variable value in another intermediate data to the similarity matrix as a component representing the similarity between the two variable values.

[Step S106]

The input data distance calculation unit 221 generates a new transformation matrix relating to a variable selected based on the similarity matrix.

[Step S107]

The input data distance calculation unit 221 determines whether or not all variables are selected. In a case where selection of all variables is completed, the processing proceeds to Step S108. In a case where an unselected variable exists, the processing proceeds to Step S104.

[Step S108]

The input data distance calculation unit 221 generates intermediate data for every comparison target data by using the transformation matrix that is newly generated with respect to each variable.

[Step S109]

The input data distance calculation unit 221 calculates similarity of the plurality of pieces of intermediate data, which are generated, in Step S109.

[Step S110]

The input data distance calculation unit 221 determines whether or not processing termination conditions are satisfied. Examples of the processing termination conditions include whether or not similarity converges, and a conditions in which a loop of Steps S104 to S110 is repeated a predetermined number of times or greater. In a case where processing termination conditions are satisfied, the similarity calculation processing is terminated. In a case where the processing termination conditions are not satisfied, the input data distance calculation unit 221 initializes a variable selection state to non-selection, and processing proceeds to Step S104.

It is possible to calculate the similarity between a plurality of pieces of comparison target data in the above-described procedure. Hereinafter, a specific example of the similarity calculation will be described with reference to FIG. 21 to FIG. 24.

Figure 21:
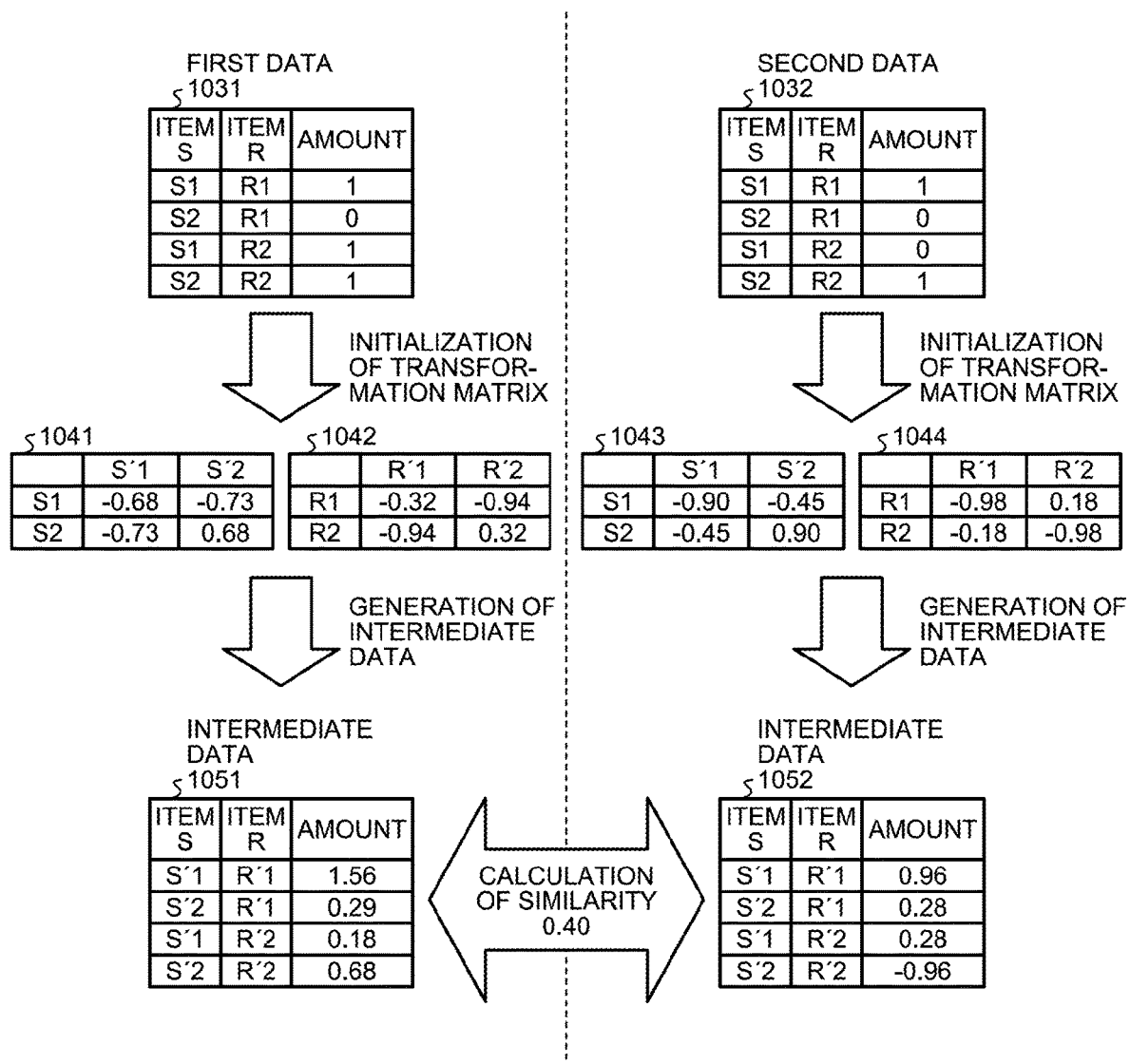
FIG. 21 is a view illustrating a generation example of intermediate data by using a transformation matrix in an initial state.

FIG. 21 is a view illustrating a generation example of intermediate data by using a transformation matrix in an initial state. In the example illustrated in FIG. 21, first data 1031 and second data 1032 are comparison target data. First, a transformation matrix 1041 of an "item S" and a transformation matrix 1042 of an "item R" of the first data 1031 are initialized, and the first data 1031 is transformed to intermediate data 1051 by using the transformation matrices 1041 and 1042 in an initial state. Similarly, a transformation matrix 1043 of an "item S" and a transformation matrix 1044 of an "item R" of the second data 1032 are initialized, and the second data 1032 is transformed to intermediate data 1052 by using the transformation matrices 1043 and 1044 in an initial state. In addition, similarity between the intermediate data 1051 of the first data 1031 and the intermediate data 1052 of the second data 1032 is calculated. In the example illustrated in FIG. 11, the similarity is "0.40".

Next, it is assumed that a variable "item S" is selected. When the "item S" is selected, a transformation matrix of the "item S" is updated.

Figure 22:
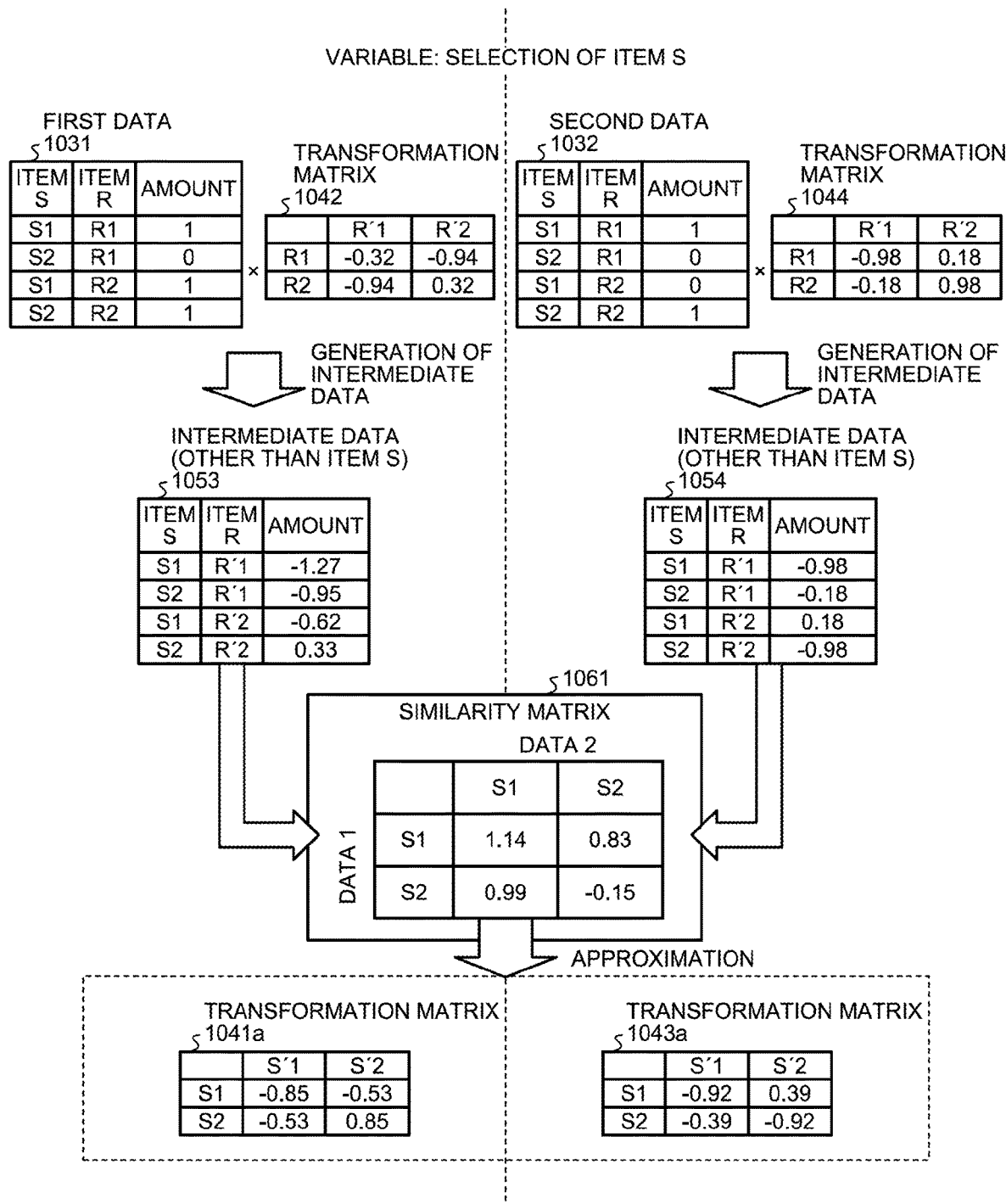
FIG. 22 is a view illustrating an update example of a transformation matrix of "term S"

FIG. 22 is a view illustrating an update example of a transformation matrix of the "term S". Intermediate data 1053, in which variable values other than the "item S" are transformed, is generated by using the transformation matrix 1042 for the "item R" with respect to the first data 1031. Similarly, intermediate data 1054, in which variable values other than the "item S" are transformed, is generated by using the transformation matrix 1044 for the "item R" with respect to the second data 1032. Next, a similarity matrix 1061 representing similarity between variable values of the two pieces of generated intermediate data 1053 and 1054 is generated. In addition, two transformation matrices 1041a and 1043a capable of obtaining an approximate value as that of the similarity matrix 1061 are generated through multiplication based on the similarity matrix 1061.

Next, it is assumed that a variable "item R" is selected. When the "item R" is selected, a transformation matrix of the "item R" is updated.

Figure 23:
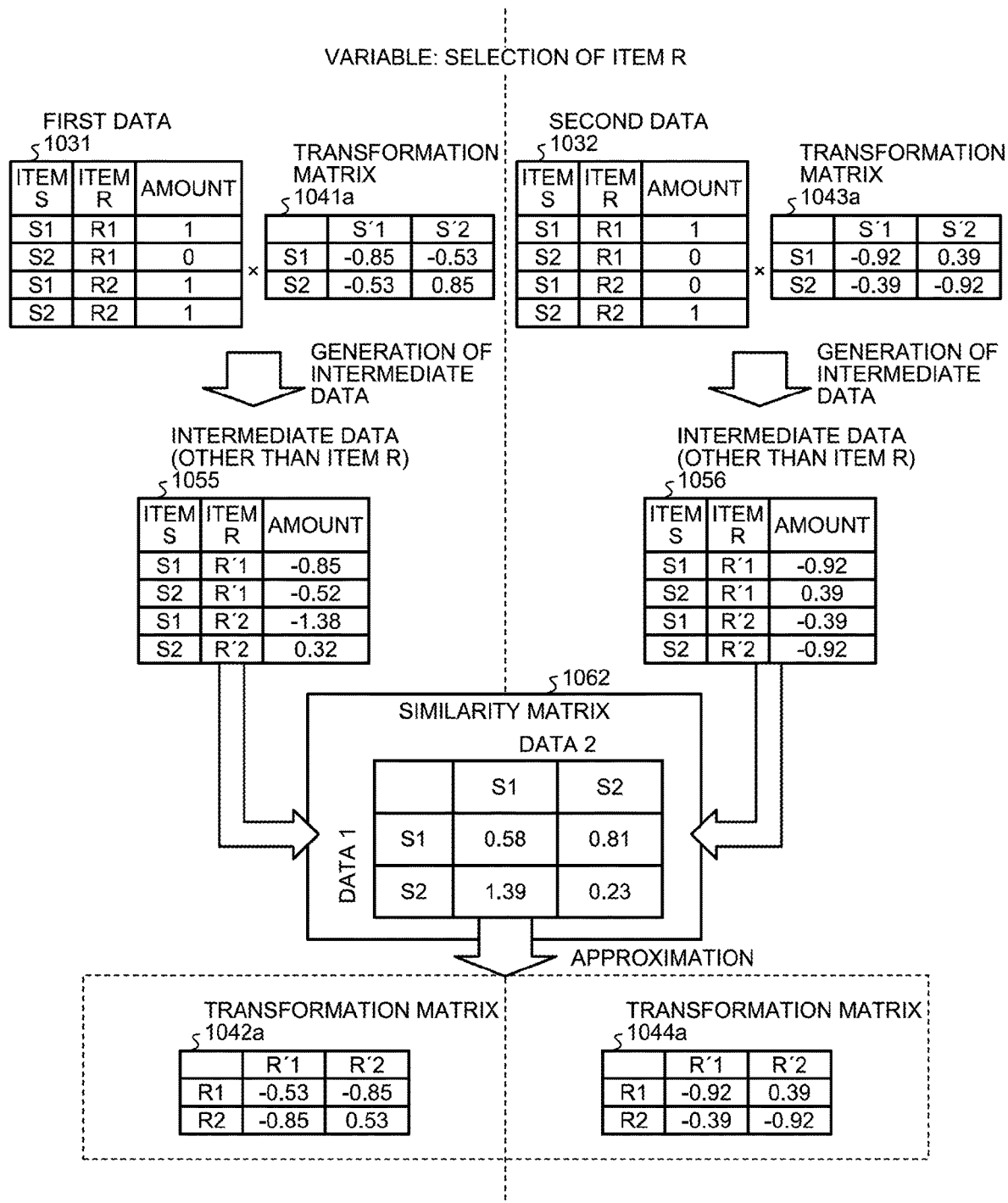
FIG. 23 is a view illustrating an update example of a transformation matrix of "term R"

FIG. 23 is a view illustrating an update example of the transformation matrix of the "item R". Intermediate data 1055, in which variable values other than the "item R" are transformed, is generated by using the transformation matrix 1041a for the "item S" with respect to the first data 1031. Similarly, intermediate data 1056, in which variable values other than the "item R" are transformed, is generated by using the transformation matrix 1043a for the "item S" with respect to the second data 1032. Next, a similarity matrix 1062 representing similarity between variable values of the two pieces of generated intermediate data 1055 and 1056 is generated. In addition, two transformation matrices 1042a and 1044a capable of obtaining an approximate value as that of the similarity matrix 1062 are generated through multiplication based on the similarity matrix 1062.

With respect to each of the "item S" and the "item R", when update of the transformation matrix is terminated, intermediate data is generated based on the transformation matrices 1041a, 1042a, 1043a, and 1044a after update.

Figure 24:
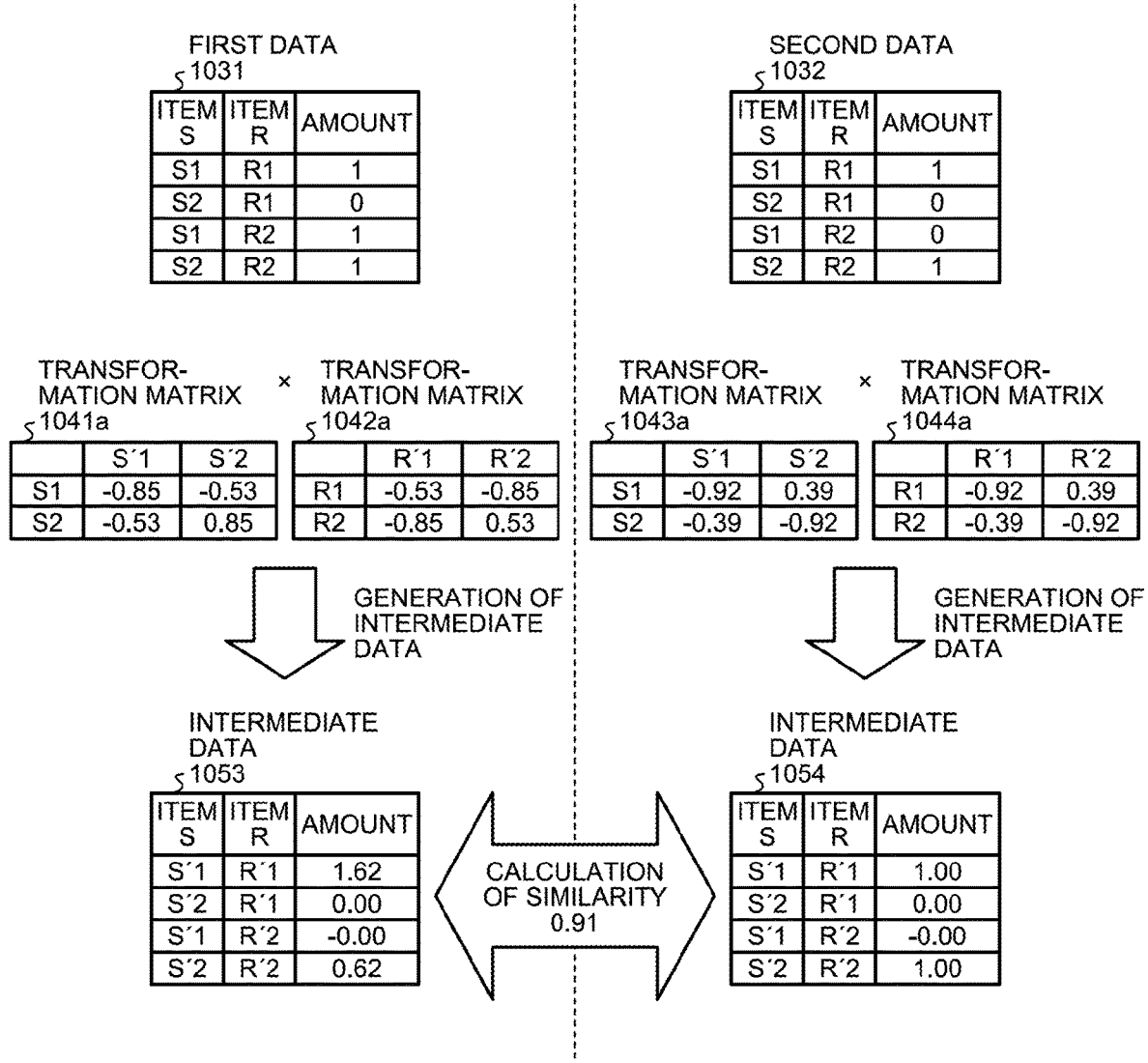
FIG. 24 is a view illustrating a generation example of intermediate data by using a transformation matrix after update.

FIG. 24 is a view illustrating a generation example of intermediate data by using a transformation matrix after update. Intermediate data 1053 is generated from the first data 1031 by using the transformation matrices 1041a and 1042a after update. Similarly, intermediate data 1054 is generated from the second data 1032 by using the transformation matrices 1043a and 1044a after update. In addition, similarity between the two pieces of generated intermediate data 1053 and 1054 is calculated. In the example illustrated in FIG. 24, the similarity is "0.91".

The similarity between the two pieces of intermediate data 1053 and 1054 generated by using the transformation matrices 1041a, 1042a, 1043a, and 1044a after update is higher than the similarity (refer to FIG. 18) between the two pieces of intermediate data 1051 and 1052 generated by using the transformation matrices 1041 to 1044 before update. That is, when updating the transformation matrices 1041 to 1044, the similarity between a plurality of pieces of the intermediate data generated becomes higher. When the update processing is further performed with respect to the transformation matrices 1041a, 1042a, 1043a, and 1044a after update, it is also possible to raise similarity between the plurality of pieces of intermediate data. However, when repeating the update processing several times, the degree of rising of the similarity between the plurality of pieces of intermediate data slows down, and the similarity converges to a certain extent of similarity.

For example, when the rising of the similarity becomes a predetermined value or less, the input data distance calculation unit 221 determines finally calculated similarity between the plurality of pieces of intermediate data as similarity between the first data 1031 and the second data 1032 which are comparison targets. The input data distance calculation unit 221 calculates a distance from the similarity that is determined, and stores the distance in the input data distance storage unit 222.

As described above, when similarity between a plurality of pieces of data is determined in accordance with similarity between a plurality of pieces of intermediate data generated by using a transformation matrix, similarity determination accuracy is improved, and accuracy relating to a distance between the plurality of pieces of data is also improved.

Hereinafter, description will be given of FIG. 25 and FIG. 26 as a comparative example that is a calculation example of similarity by only sorting of variable values included in data, and FIG. 27 and FIG. 28 as a calculation example of similarity between a plurality of pieces of intermediate data generated by using a transformation matrix.

FIG. 25 is a first view illustrating a comparison example of similarity calculation. It is assumed that similarity between first data 1071 and second data 1072 is calculated as illustrated in FIG. 25. When classifying methods of a relationship between human beings or objects, there is a possibility that a role served by a device of "S1" in a period in which the first data 1071 is collected may be served by a device of "S2" in a period in which the second data 1072 is collected. Here, in the example illustrated in FIG. 25, a communication source host or a communication destination host is associated with an additional variable value, and sorting of records in each piece of data is performed.

Two pieces of transformed data 1073 and 1074 are generated by sorting. The two pieces of transformed data 1073 and 1074 are the same in a combination sequence of variable values representing a relationship between a communication source host, a communication destination host, and a port. In the example illustrated in FIG. 25, a record representing a combination of "S'1", "R'1", and "P'1" is registered at the highest layer of the two pieces of transformed data 1073 and 1074, and a record representing a combination of "S'1", "R'1", and "P'2" is registered at the subsequent layer.

It is possible to calculate similarity between two pieces of transformed data 1073 and 1074 by comparing values of amounts in respective records arranged in a predetermined sequence in the two pieces of transformed data 1073 and 1074. For example, an inner product between vectors in which a value of the amount is set as a component is set as similarity. In this case, similarity varies in accordance with association between respective variable values of the first data 1071 and the second data 1072, and variable value of the two pieces of transformed data 1073 and 1074. Accordingly, with respect to all patterns of the association, the two pieces of transformed data 1073 and 1074 are generated to maximize the similarity. In addition, the maximum value of the similarity obtained from the two pieces of transformed data 1073 and 1074 is determined as similarity between the first data 1071 and the second data 1072.

FIG. 26 is a second view illustrating a comparison example of similarity calculation. When calculating the similarity by the method illustrated in FIG. 25, similarity between the first data 1071 and the second data 1072 is "0.89". When calculating similarity between the first data 1071 and third data 1075 by the same method, similarity becomes "0.89".

Here, in a relationship between the communication destination host and the port in the first data 1071 and the second data 1072, it can be seen that only a combination of {R1, P1} or {R2, P2} is included in a record in which the value of "amount" is "1" or more. In contrast, in the third data 1075, it can be seen that a combination of {R1, P2} is included in a record in which the value of "amount" is "1" or more. In this case, the first data 1071 and the second data 1072 are communication logs before and after communication source hosts are separated and merged, and thus there is a high possibility that the first data 1071 and the second data 1072 may be communication logs relating to a similar event. In contrast, the third data 1075 is considered as a communication log relating to an additional event.

However, when calculating similarity by the method illustrated in FIG. 25, as illustrated in FIG. 26, with regard to the first data 1071, similarity with the second data 1072 and similarity with the third data 1075 become the same as each other. That is, similarity is not correctly calculated.

Next, description will be given of a case where similarity between the first data 1071 and the second data 1072, and similarity between the first data 1071 and the third data 1075 are calculated by a method according to the second embodiment with reference to FIG. 27 and FIG. 28.

Figure 27:
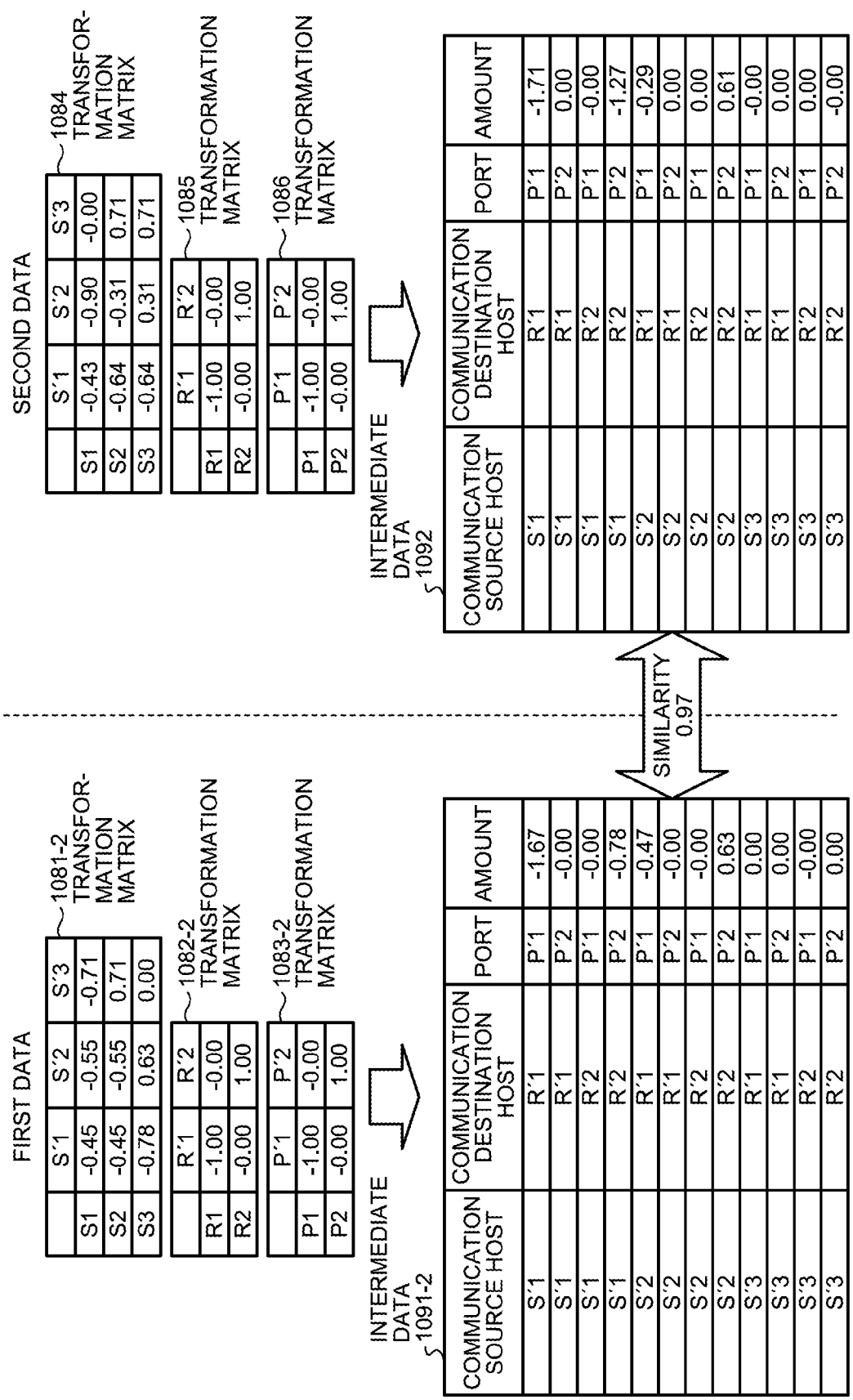
FIG. 27 is a first view illustrating a similarity calculation example.

FIG. 27 is a first view illustrating a calculation example of similarity by the input data distance calculation unit 221. FIG. 27 illustrates a calculation example of similarity between the first data 1071 and the second data 1072. With respect to the first data 1071, transformation matrices 1081-2 to 1083-2 respectively corresponding to a communication source host, a communication destination host, and a port are generated. The first data 1071 is transformed to intermediate data 1091-2 by using the transformation matrices 1081-2 to 1083-2. In addition, with respect to the second data 1072, transformation matrices 1084 to 1086 respectively corresponding to the communication source host, the communication destination host, and the port are generated. The second data 1072 is transformed to intermediate data 1092 by using the transformation matrices 1084 to 1086. Similarity between the intermediate data 1091-2 of the first data 1071 and the intermediate data 1092 of the second data 1072 is "0.97".

FIG. 28 is a second view illustrating a calculation example of similarity by the input data distance calculation unit 221. FIG. 28 illustrates a calculation example of similarity between the first data 1071 and the third data 1075. With respect to the first data 1071, transformation matrices 1081-3 to 1083-3 respectively corresponding to the communication source host, the communication destination host, and the port are generated. The first data 1071 is transformed to intermediate data 1091-3 by using the transformation matrices 1081-3 to 1083-3. In addition, with respect to the third data 1075, transformation matrices 1087 to 1089 respectively corresponding to the communication source host, the communication destination host, and the port are generated. The third data 1075 is transformed to intermediate data 1093 by using the transformation matrices 1087 to 1089. Similarity between the intermediate data 1091-3 of the first data 1071 and the intermediate data 1093 of the third data 1075 is "0.94".

From the similarity calculation results in FIG. 27 and FIG. 28, it can be seen that the first data 1071 is more similar to the second data 1072 in comparison to the third data 1075. That is, a similarity calculation system is improved through similarity calculation in which a relationship between variable values is correctly reflected.

Furthermore, when raising accuracy of similarity by the method illustrated in FIG. 25 and FIG. 26, similarity is calculated with respect to all patterns of association, and thus the amount of calculation becomes enormous.

For example, it is assumed that three items of human beings or objects exist, and the number of kinds of each item is "A, B, C" (A, B, and C are integers of one or greater). At this time, when calculating similarity by the method illustrated in FIG. 25 and FIG. 26, similarity calculation is performed with respect to combination patterns in the number of "A!B!C!". In contrast, in the method by the input data distance calculation unit 221, a calculation amount is proportional to $(A^2+B^2+C^2)ABC$. This represents that when "A, B, C" are "10, 10, 10", speed increases up to approximately 160,000,000,000,000 times.

As described above, according to the similarity calculation method by the input data distance calculation unit 221, even in a case where a similar even is recorded in another state in the course of generating a log, it is possible to efficiently perform determination of similarity with high accuracy through transformation with weighting, and it is possible to perform determination of a distance with high accuracy.

[c] Other Embodiments

In the second embodiment, description has been given of an example in which similarity and a distance between communication logs are calculated for every unit period, but similarity and a distance of other various pieces of information can be calculated by the same technology.

Hereinbefore, embodiments have been described, but configurations of respective portions illustrated in the embodiments can be substituted with other configurations having the same function. In addition, other arbitrary configurations or processes may be added. In addition, two or more arbitrary configurations (characteristics) in the above-described embodiments may be combined with each other.

According to the aspect, it is possible to select learning data capable of improving output factor estimation accuracy.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a learning data selection program that causes a computer to execute a process comprising:

extracting a first input data group relating to first input data in response to designation of the first input data included in an input data group input to a machine learning model, in accordance with a reference in which a collection timing of each data of the first input data group has a predetermined relationship with the first input data;

acquiring a first transformed data group generated by transforming the first input data group by the machine learning model, the first transformed data group including first transformed data based on the first input data;

calculating a first set of distances between the first input data and each data of the first input data group other than the first input data and a second set of distances between the first transformed data and each data of the first transformed data group other than the first transformed data;

selecting learning target data from the first input data group based on the first set of distances and the second set of distances; and performing, based on the selected learning target data, machine learning of another machine learning model configured to estimate a factor which causes the machine learning model to output a classification result.

2. The non-transitory computer-readable recording medium according to claim 1, wherein the learning target data is extracted based on data contents of each piece of output data included in the first output data group.

3. The non-transitory computer-readable recording medium according to claim 2, wherein the learning target data is extracted based on a ratio of the data contents included in the first output data group.

4. The non-transitory computer-readable recording medium according to claim 3, wherein the learning target data is extracted based on a ratio between a positive example and a negative example of the data contents included in the first output data group.

5. The non-transitory computer-readable recording medium according to claim 1, wherein input data in which a data acquisition timing has a predetermined relationship with the first input data is specified as the first input data group.

6. The non-transitory computer-readable recording medium according to claim 1, wherein input data in which a data generation source has a predetermined relationship with the first input data is specified as the first input data group.

7. The non-transitory computer-readable recording medium according to claim 1, wherein the distance between the first input data and each piece of data of the first input data group is calculated by individually transforming the first input data and the data of the first input data group.

8. A learning data selection method comprising:
   extracting a first input data group relating to first input data in response to designation of the first input data included in an input data group input to a machine learning model, in accordance with a reference in which a collection timing of each data of the first input data group has a predetermined relationship with the first input data;
   acquiring a first transformed data group generated by transforming the first input data group by the machine learning model, the first transformed data group including first transformed data based on the first input data;
   calculating a first set of distances between the first input data and each data of the first input data group other than the first input data and a second set of distances between the first transformed data and each data of the first transformed data group other than the first transformed data;
   selecting learning target data from the first input data group based on the first set of distances and the second set of distances; and
   performing, based on the selected learning target data, machine learning of another machine learning model configured to estimate a factor which causes the machine learning model to output a classification result, by a processor.

9. A learning data selection device comprising:
   a processor configured to:
   extract a first input data group relating to first input data in response to designation of the first input data included in an input data group input to a machine learning model, in accordance with a reference in which a collection timing of each data of the first input data group has a predetermined relationship with the first input data;
   acquire a first transformed data group generated by transforming the first input data group by the machine learning model, the first transformed data group including first transformed data based on the first input data;
   calculate a first set of distances between the first input data and each data of the first input data group other than the first input data and a second set of distances between the first transformed data and each data of the first transformed data group other than the first transformed data;
   select learning target data from the first input data group based on the first set of distances and the second set of distances; and
   perform, based on the selected learning target data, machine learning of another machine learning model configured to estimate a factor which causes the machine learning model to output a classification result.

* * * * *